US011091109B1

(12) United States Patent
Patel et al.

(10) Patent No.: US 11,091,109 B1
(45) Date of Patent: Aug. 17, 2021

(54) KNEE BOLSTER WITH VARIABLE RESISTANCE TO FORWARD FORCE

(71) Applicant: Ford Global Technologies, LLC, Dearborn, MI (US)

(72) Inventors: Deepak Patel, Canton, MI (US); Pardeep Kumar Jindal, Canton, MI (US); Zhibing Deng, Northville, MI (US); Rahul Makwana, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/816,360

(22) Filed: Mar. 12, 2020

(51) Int. Cl.
| | |
|---|---|
| *B60R 21/13* | (2006.01) |
| *B60R 21/04* | (2006.01) |
| *B60R 21/00* | (2006.01) |
| *B60R 21/045* | (2006.01) |
| *B60R 21/055* | (2006.01) |
| *B60R 21/013* | (2006.01) |

(52) U.S. Cl.
CPC .......... *B60R 21/045* (2013.01); *B60R 21/055* (2013.01); *B60R 2021/0051* (2013.01); *B60R 2021/0053* (2013.01); *B60R 2021/01315* (2013.01); *B60R 2021/0414* (2013.01)

(58) Field of Classification Search
CPC ...... B60R 2021/024; B60R 2021/0053; B60R 21/055; B60R 21/045; B60R 2021/0051
See application file for complete search history.

(56) References Cited

U.S. PATENT DOCUMENTS

| 4,951,963 A | * | 8/1990 | Behr | ............ B60R 21/02 280/753 |
|---|---|---|---|---|
| 5,037,130 A | | 8/1991 | Okuyama | |

(Continued)

FOREIGN PATENT DOCUMENTS

| CN | 101081612 A | | 12/2007 |
|---|---|---|---|
| CN | 107719290 A | * | 2/2018 |

(Continued)

OTHER PUBLICATIONS

Machine translation of CN 107719290 A from espacenet.com, Apr. 9, 2021.*

*Primary Examiner* — Paul N Dickson
*Assistant Examiner* — Maxwell L Meshaka
(74) *Attorney, Agent, or Firm* — David Coppiellie; Price Heneveld LLP

(57) ABSTRACT

A vehicle comprises: a knee bolster; a movable obstruction disposed forward of the knee bolster; a seating assembly rearward of the knee bolster; a sensor that generates output; and a controller in communication with the sensor that (a) determines the attribute of the passenger from the output that the sensor generates, and (b) either (i) causes the movable obstruction to obstruct forward movement of the knee bolster based on the determined attribute of the passenger, or (ii) causes the movable obstruction not to obstruct the forward movement of the knee bolster based on the determined attribute of the passenger. The attribute of the passenger can be the weight of the passenger. The controller can cause the movable obstruction to obstruct forward movement of the knee bolster because the weight of the passenger is greater than a predetermined threshold weight.

20 Claims, 16 Drawing Sheets

(56) References Cited

U.S. PATENT DOCUMENTS

| | | | |
|---|---|---|---|
| 6,283,508 B1 * | 9/2001 | Nouwynck | ............ B60R 21/02 |
| | | | 280/753 |
| 7,040,653 B1 | 5/2006 | Breed | |
| 8,333,407 B2 | 12/2012 | An | |
| 2008/0093831 A1 | 4/2008 | Ellison | |
| 2012/0228856 A1 * | 9/2012 | Arima | .................. B60R 21/045 |
| | | | 280/751 |

FOREIGN PATENT DOCUMENTS

| | | | | |
|---|---|---|---|---|
| DE | 19747423 C1 * | 4/1999 | ............ | B60R 21/02 |
| DE | 102012110835 A1 | 1/2014 | | |
| EP | 0879155 B1 | 9/2003 | | |
| EP | 1862359 A1 * | 12/2007 | ........... | B60R 21/045 |
| JP | 2006027608 A | 2/2006 | | |
| KR | 20060024979 A | 3/2006 | | |
| WO | 9000181 | 1/1990 | | |

* cited by examiner

KNEE BOLSTER WITH VARIABLE RESISTANCE TO FORWARD FORCE

FIELD OF THE DISCLOSURE

The present invention generally relates to a knee bolster for a vehicle.

BACKGROUND OF THE DISCLOSURE

A vehicle sometimes includes a knee bolster disposed forward of a knee of a passenger. The knee bolster helps reduce the likelihood of the passenger contacting a framing structure of the vehicle. The element is sometimes referred to as a knee bolster.

However, the design challenge for a knee bolster is to accommodate varying occupant sizes in different crash events.

SUMMARY OF THE DISCLOSURE

The disclosure resolves this challenge by altering the level of resistance that the knee bolster provides as a function of the weight, size, or some other attribute of the passenger.

According to one aspect of the present invention, a method comprises: altering a level of resistance of a knee bolster of a vehicle against a passenger of the vehicle while the vehicle engages in an impact event as a function of an attribute of the passenger.

Embodiments of the first aspect of the invention can include any one or a combination of the following features:
the attribute of the passenger is the weight of the passenger;
altering the level of resistance includes either (i) increasing the level of resistance when the weight of the passenger is above a threshold value, or (ii) decreasing the level of resistance when the weight of the passenger is below a threshold value;
the method further comprises determining the weight of the passenger;
the method further comprises determining whether the weight of the passenger exceeds a predetermined threshold weight;
the weight of the passenger is determined to exceed the predetermined threshold weight, and altering the level of resistance of the knee bolster of the vehicle includes increasing the level of resistance of the knee bolster;
the weight of the passenger is determined to be below the predetermined threshold weight, and altering the level of resistance of the knee bolster of the vehicle includes decreasing the level of resistance of the knee bolster;
determining the weight of the passenger includes a weight sensor disposed within a seating assembly that the passenger occupies providing an output signal from which the weight of the passenger is determined;
altering the level of resistance of the knee bolster includes either (i) moving a movable obstruction to an obstructing position opposing a forward surface of the knee bolster, or (ii) moving the movable obstruction from the obstructing position to a non-obstructing position not opposing the forward surface of the knee bolster;
the vehicle further comprising a support structure and a movable obstruction;
the knee bolster including a first section connected to the support structure and a second section not connected to the support structure;
altering the level of resistance of the knee bolster includes either (i) moving the movable obstruction to oppose the second section of the knee bolster, or (ii) moving the movable obstruction not to oppose the second section of the knee bolster;
the vehicle further comprises (i) an upper cross beam, (ii) a lower cross beam that is disposed horizontally below the upper cross beam, (iii) a pyrotechnic device attached to the lower cross beam, (iv) an axle projecting forward from the lower cross beam, (v) a pulley attached to the axle and having an axis of rotation coincident with an axis of the axle, (vi) a cable attached to the pulley and the pyrotechnic device, and (vii) a movable obstruction attached to the axle forward of the pulley;
the knee bolster further includes an upper end that is attached to the upper cross beam, and a lower end disposed horizontally below the upper end and adjacent to the lower cross beam and forward of the lower cross beam, the lower end of the knee bolster including an aperture through which the axle extends, with the pulley disposed between the lower cross beam and the lower end of the knee bolster and the movable obstruction forward of a forward surface of the lower end of the knee bolster; and
altering the level of resistance of the knee bolster includes either (i) firing the pyrotechnic device to pull the cable, rotate the pulley, and rotate the movable obstruction to be forward of the forward surface of the lower end of the knee bolster to resist forward movement of the lower end of the knee bolster, or (ii) firing the pyrotechnic device to pull the cable, rotate the pulley, and rotate the movable obstruction to not be forward of the forward surface of the lower end of the knee bolster to not resist forward movement of the lower end of the knee bolster.

According to a second aspect of the present invention, a vehicle comprises: a knee bolster; a movable obstruction disposed forward of the knee bolster; a seating assembly rearward of the knee bolster; a sensor that generates output from which an attribute of a passenger of the seating assembly can be determined; and a controller in communication with the sensor that (a) determines the attribute of the passenger from the output that the sensor generates, and (b) either (i) causes the movable obstruction to obstruct forward movement of the knee bolster based on the determined attribute of the passenger, or (ii) causes the movable obstruction not to obstruct the forward movement of the knee bolster based on the determined attribute of the passenger.

Embodiments of the second aspect of the invention can include any one or a combination of the following features:
the attribute of the passenger is the weight of the passenger;
the controller causes the movable obstruction to obstruct forward movement of the knee bolster based on the weight of the passenger being greater than a predetermined threshold weight;
the controller causes the movable obstruction to obstruct forward movement of the knee bolster by causing the movable obstruction to move from a non-obstructing position that does not obstruct forward movement of the knee bolster to an obstructing position that obstructs forward movement of the knee bolster;
the vehicle further comprises a support structure;
the knee bolster includes a first section coupled to the support structure and a second section that is not coupled to the support structure;

the controller causes the movable obstruction to obstruct forward movement of the second section by causing the movable obstruction to move from (i) the non-obstructing position that does not obstruct forward movement of the second section of the knee bolster to (ii) the obstructing position that opposes a forward surface of the second section of the knee bolster and thereby obstructs forward movement of the second section of the knee bolster;

the support structure is a cross beam that extends laterally across the vehicle, and the vehicle further comprises a second cross beam that also extends laterally across the vehicle;

the second section is proximate the second cross beam but not coupled thereto;

the vehicle further comprises an axle coupled to the second cross beam and rotatable about an axis, the movable obstruction attached to the axle;

the controller causes the movable obstruction to obstruct forward movement of the second section of the knee bolster by causing the axle to rotate and thereby rotate the movable obstruction from the non-obstructing position to the obstructing position;

the vehicle further comprises (i) a pyrotechnic device attached to the second cross beam and in communication with the controller, (ii) a pulley attached to the axle and having an axis of rotation coincident with the axis of the axle, and (iii) a cable attached to the pulley and the pyrotechnic device;

the controller causes the axle to rotate by causing the pyrotechnic device to fire, which pulls the cable, which rotates the pulley, which rotates the movable obstruction from the non-obstructing position to the obstructing position;

the vehicle further comprises an impact sensor in communication with the controller;

the controller determines that the vehicle is engaged in an impact event based on output data from the impact sensor and then either (i) causes the movable obstruction to obstruct forward movement of the knee bolster based on the determined attribute of the passenger, or (ii) causes the movable obstruction not to obstruct the forward movement of the knee bolster based on the determined attribute of the passenger;

the attribute of the passenger is a weight of the passenger;

the controller determines that the weight of the passenger is above a predetermined threshold weight; and the controller further determines that the vehicle is engaged in an impact event based on output from an impact sensor and then causes the movable obstruction to obstruct forward movement of the knee bolster.

According to a third aspect of the present invention, a vehicle comprises: an upper cross beam extending laterally across the vehicle; a lower cross beam extending laterally across the vehicle, the lower cross beam being horizontally below the upper cross beam; a pyrotechnic device attached to the lower cross beam; an axle projecting forward from the lower cross beam; a pulley attached to the axle and having an axis of rotation coincident with an axis of the axle; a cable including a first end attached to the pyrotechnic device and a second end attached to the pulley; a knee bolster including an upper end attached to the upper cross beam and a lower end proximate the lower cross beam but not attached thereto; a movable obstruction attached to the axle forward of the pulley, the movable obstruction having an obstructing position forward of the lower end of the knee bolster so as to resist forward movement of the lower end of the knee bolster, and a non-obstructing position that does not resist forward movement of the lower end of the knee bolster; a seating assembly including a weight sensor; an impact sensor; and a controller in communication with the weight sensor, the impact sensor, and the pyrotechnic device.

Embodiments of the third aspect of the invention can include any one or a combination of the following features:

the controller (i) determines from output from the weight sensor that a passenger of the seating assembly is greater than a predetermined threshold weight, (ii) determines that the vehicle is engaged in an impact event from output from the impact sensor, and (iii) causes the pyrotechnic device to fire thereby moving the movable obstruction to the obstructing position forward of the lower end of the knee bolster so as to resist forward movement of the lower end of the knee bolster during the impact event.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
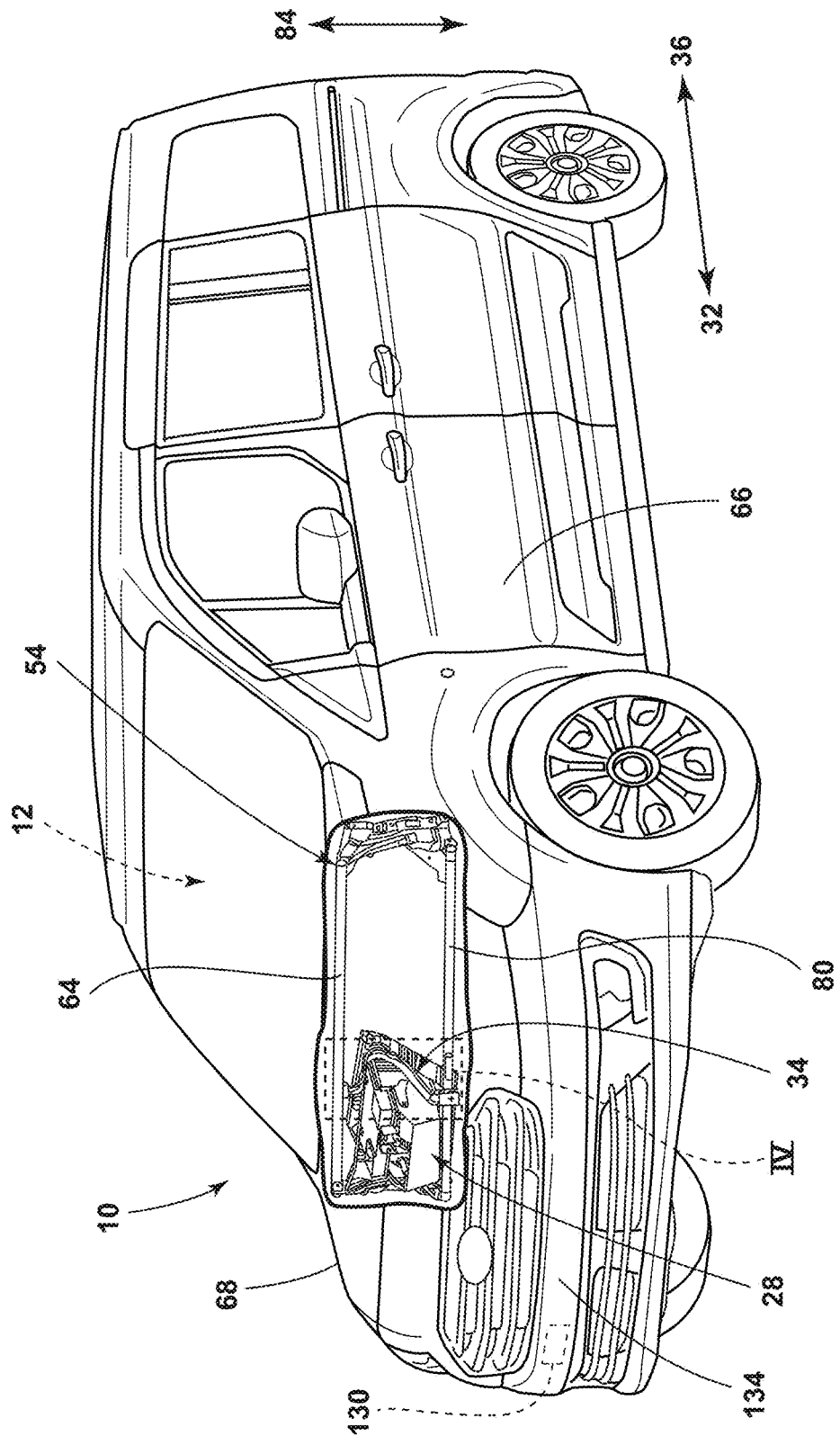
FIG. 1 is a perspective view of a vehicle, with a portion cut away illustrating a knee bolster attached to an upper cross beam.
Figure 2:
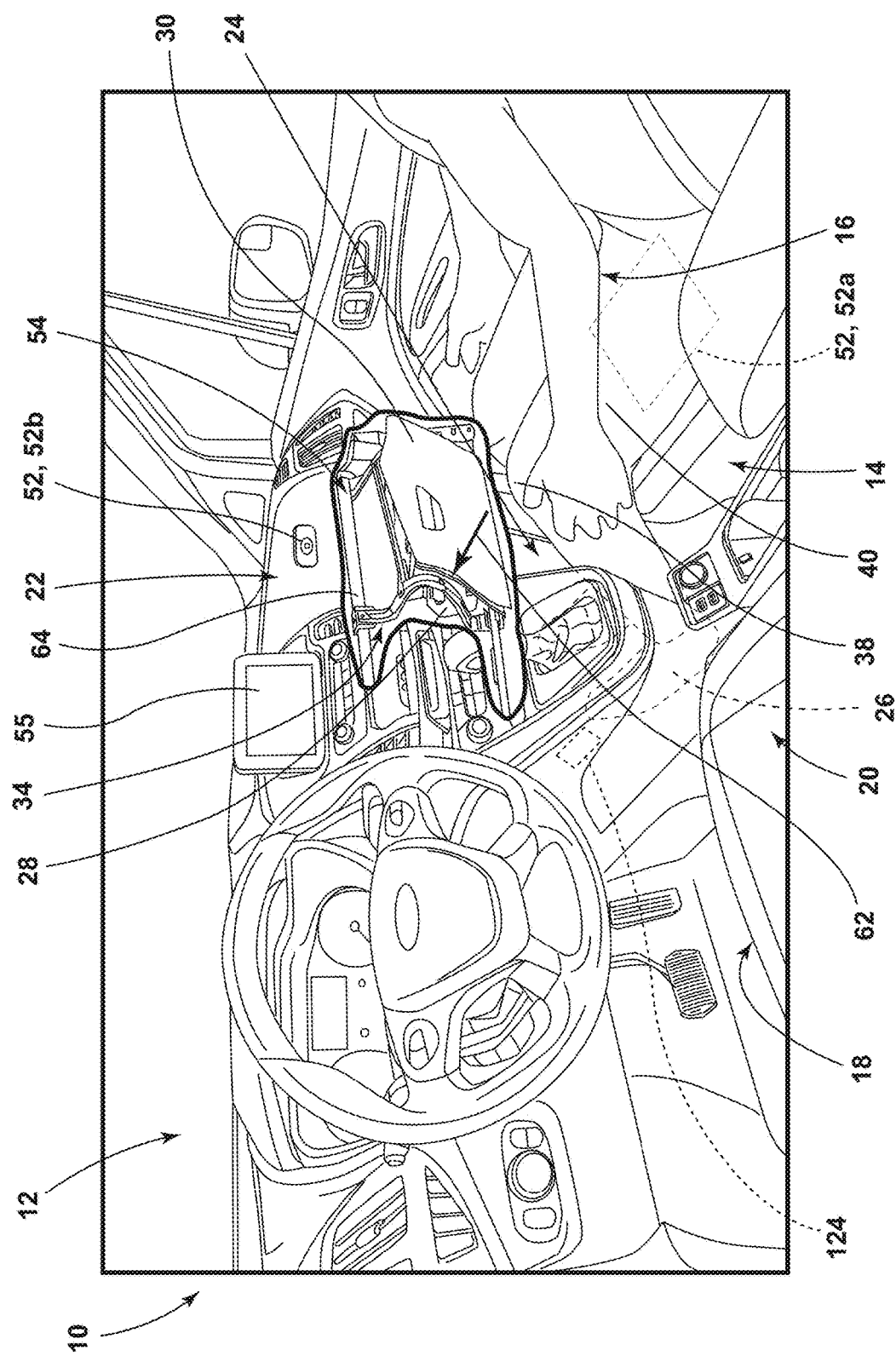
FIG. 2 is a perspective view of an interior of the vehicle of FIG. 1, with a portion cut away illustrating the knee bolster disposed forward of a passenger of a seating assembly.
Figure 3:
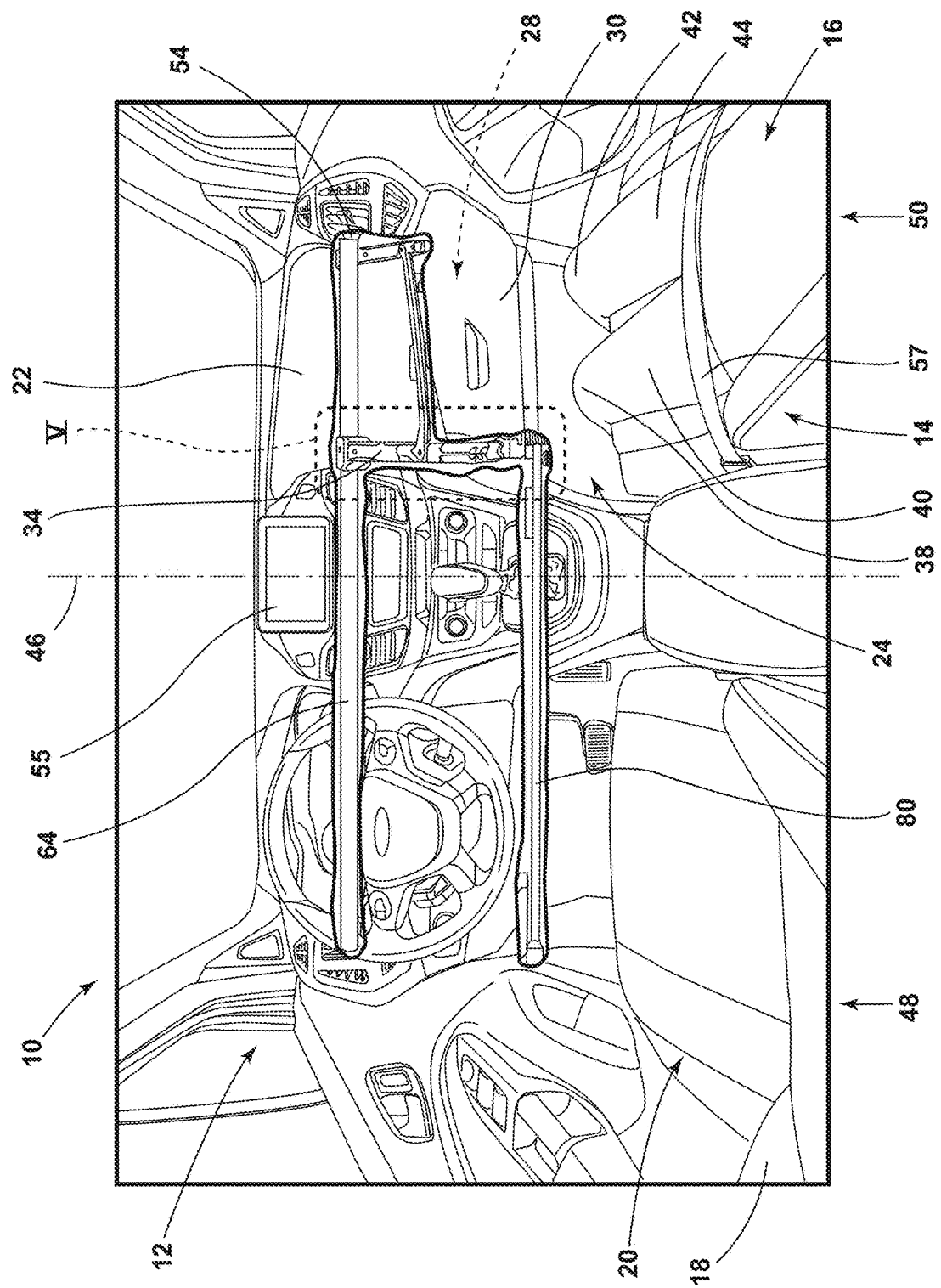
FIG. 3 is a view of the interior of the vehicle of FIG. 1, with a portion cut away illustrating the knee bolster disposed forward of a left knee and a left femur of the passenger of the seating assembly.

Referring now to FIGS. 1-3, a vehicle 10 includes an interior 12 and a seating assembly 14 disposed in the interior 12. A passenger 16 occupies the seating assembly 14 when the vehicle 10 transports the passenger 16. In embodiments, the vehicle 10 includes additional seating assemblies, such as a seating assembly 18 disposed adjacent to the seating assembly 14, which collectively form a first row of seating 20. In embodiments, the first row of seating 20 is the most forward row of seating of the vehicle 10. In embodiments, a second row of seating (not illustrated) is disposed rearward 36 of the first row of seating 20. In embodiments, the vehicle 10 further includes a dashboard 22. The dashboard 22 is generally forward 32 of the first row of seating 20 and seating assembly 14. The dashboard 22 can be disposed horizontally above a foot well 24, where feet 26 of the passenger 16 may extend while occupying the seating assembly 14. In embodiments, the dashboard 22 includes a glove compartment 28 and a door 30 providing selective access into the glove compartment 28. The glove compartment 28 is disposed generally forward 32 of the seating assembly 14 and the passenger 16 of the seating assembly 14 when present. In the illustrated embodiment, the vehicle 10 is a passenger wagon. However, in other embodiments, the vehicle 10 is a car, a truck, a bus, a van, a cargo van, an off-road vehicle, and any other vehicle. The vehicle 10 can be passenger 16 operated or autonomously operated. The vehicle 10 can have an electric motor, an internal combustion engine, or both, among other things, to propel the vehicle 10.

The vehicle 10 further includes a knee bolster 34. The knee bolster 34 is disposed forward 32 of the seating assembly 14 (i.e., the seating assembly 14 is rearward 36 of the knee bolster 34). The knee bolster 34 is thus forward 32 of the passenger 16 occupying the seating assembly 14. In other embodiments, the knee bolster 34 is disposed forward 32 of the seating assembly 18. In the illustrated embodiment, the knee bolster 34 is disposed forward 32 of the left knee 38 and left femur 40 of the passenger 16 of the seating assembly 14 and closer to the left knee 38 and left femur 40 of the passenger 16 than the right knee 42 and right femur 44 of the passenger 16 of the seating assembly 14. In the illustrated embodiment, the knee bolster 34 is inboard of the glove compartment 28. That is, the knee bolster 34 is disposed closer to a midline 46 of the vehicle 10 than the glove compartment 28. The midline 46 is the line through which a longitudinal (forward 32-to-rearward 36) vertical plane that divides the vehicle 10 into two approximately symmetrical halves 48, 50 extends.

The vehicle 10 further includes a sensor 52 or user interface 55 (or both), from which an attribute of the passenger 16 rearward 36 of the knee bolster 34 can be determined. For example, the attribute of the passenger 16 can be the weight of the passenger 16, the height of the passenger 16, the sex of the passenger 16, or whether the passenger 16 has engaged a safety belt 57 associated with the seating assembly 14, or some combination of those attributes. In embodiments, the user interface 55 is a touch screen display, and the vehicle 10 can prompt the passenger 16 to enter information concerning the attribute(s) desired (i.e., weight, height, etc.). In embodiments, the sensor 52 can be disposed within the seating assembly 14 and provide an output that varies as a function of the desired attribute. For example, the sensor 52 can be a bladder or capacitive sensor that provides an output that varies as a function of the weight of the passenger 16. The sensor 52 can thus be a weight sensor 52a. As another example, the sensor 52 can be a light sensor 52b (e.g., visual light camera) that provides an output from which body shape and thus approximate height and weight can be determined. The preceding are examples of useful sensors 52 and are not intended to exclude other sensors 52.

Figure 4:
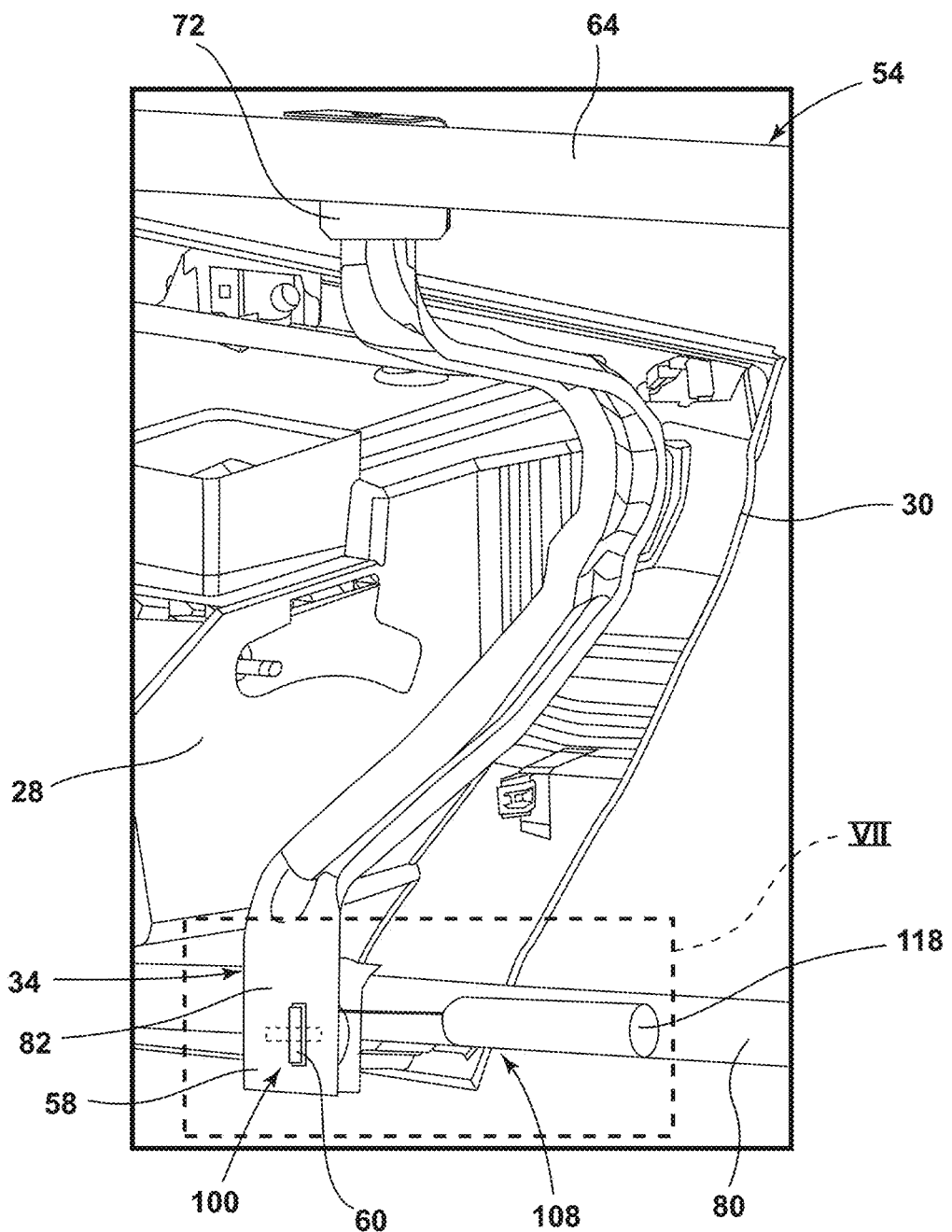
FIG. 4 is a perspective view of area IV of FIG. 1, illustrating the knee bolster with a lower end adjacent to but not attached to a lower cross beam of the vehicle, and a movable obstruction in a non-obstructing position that would not obstruct forward movement of the lower end of the knee bolster.
Figure 5:
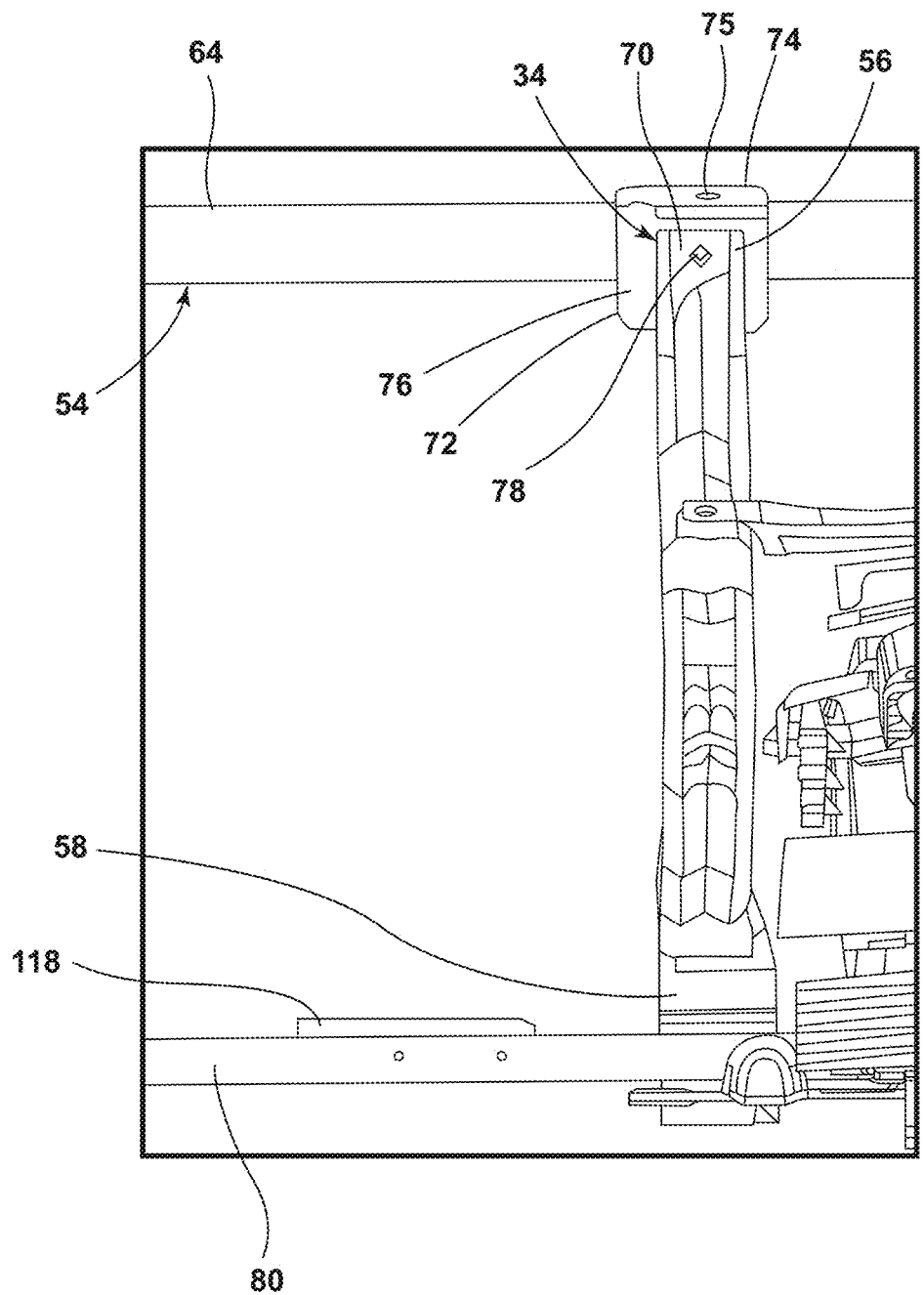
FIG. 5 is a view of area V of FIG. 3, illustrating an upper end of the knee bolster attached to the upper cross beam through a bracket.
Figure 6:
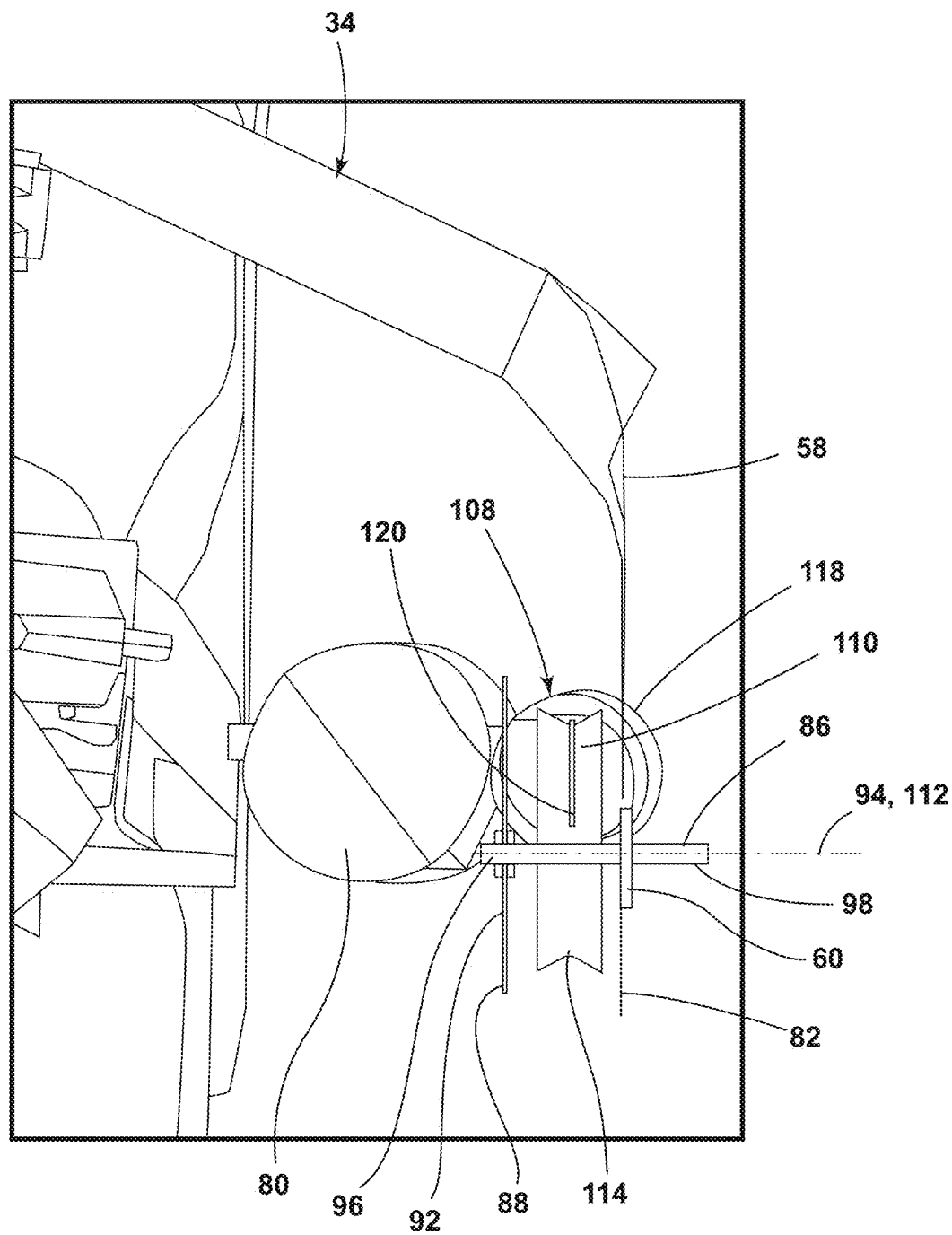
FIG. 6 is a side view of the lower end of the knee bolster disposed forward of the second cross beam and the movable obstruction attached to an axle that extends through a pulley and that is attached to the second cross beam via a bracket, and a first end of a cable attached to the pulley within a cradle of the pulley.

Referring now additionally to FIGS. 4-6, the vehicle 10 further comprises a support structure 54. The support structure 54 is a structure that supports other components of the vehicle 10. The support structure 54 can be a frame, a chassis, or a uni-body, among other things. The knee bolster 34 includes a first section 56 that is coupled to the support structure 54. The knee bolster 34 further includes a second section 58 that is not coupled to the support structure 54. As will be further detailed below, a movable obstruction 60 can be selectively placed forward 32 of the second section 58 or not placed forward 32 of the second section 58 to vary the level of resistance of the knee bolster 34 to a forward force 62 upon the knee bolster 34.

In embodiments such as the illustrated embodiment, the support structure 54 is a cross beam 64. The cross beam 64 extends laterally across the vehicle 10 from approximately one side 66 of the vehicle 10 to another side 68 of the vehicle 10. The illustrated embodiment of the knee bolster 34 is an elongated shaped metal piece, and the first section 56 of the knee bolster 34 attached to the cross beam 64 is an upper end 70 of the knee bolster 34. The upper end 70 is disposed rearward 36 of the cross beam 64. Thus, the cross beam 64 opposes the forward force 62 imposed upon the knee bolster 34 and the upper end 70 of the knee bolster 34 does not readily move forward 32 in response to the forward force 62.

In the illustrated embodiment, the upper end 70 of the knee bolster 34 is coupled to the cross beam 64 through a bracket 72. The bracket 72 is L-shaped with a top portion 74 disposed over the cross beam 64. The top portion 74 of the bracket 72 has an aperture 75 in line with an aperture (not illustrated) of the cross beam 64 to receive a fastener (not illustrated) fastening the top portion 74 of the bracket 72 to the cross beam 64. The bracket 72 further includes a vertical portion 76 approximately orthogonal to the top portion 74. The vertical portion 76 is disposed rearward 36 of the cross beam 64. The vertical portion 76 is disposed between the cross beam 64 and the upper end 70 of the knee bolster 34. The upper end 70 of the knee bolster 34 includes an aperture 78, which is in line with apertures (not illustrated) through the vertical portion 76 of the bracket 72 and the cross beam 64, to receive a fastener (not illustrated) fastening the upper end 70 of the knee bolster 34, the vertical portion 76 of the bracket 72, and the cross beam 64 together.

The vehicle 10 further includes a second cross beam 80. The second cross beam 80, like the cross beam 64, extends laterally across the vehicle 10 from approximately the side 66 to the side 68. The second cross beam 80, in the illustrated embodiment, is disposed horizontally below the cross beam 64. In such embodiments, the cross beam 64 is thus an upper cross beam 64 and the second cross beam 80 is a lower cross beam 80.

In the illustrated embodiment, the second section 58 of the knee bolster 34 is disposed proximate to the second cross beam 80 (the lower cross beam 80) but not coupled thereto. More specifically, the knee bolster 34 includes a lower end 82 at the other end of the knee bolster 34 than the upper end 70. The lower end 82 is disposed forward 32 of the lower cross beam 80 and not coupled thereto. Thus, without anything obstructing the forward 32 movement of the lower end 82 of the knee bolster 34, the forward force 62 upon the knee bolster 34 would cause the knee bolster 34 to impart a level of resistance to the forward force 62. The level of resistance in this instance can be about 1.2 kN, which may be favorable to the passenger 16 of relatively light weight (e.g., the 5 percent lightest). If the forward force 62 was sufficient to overcome the level of resistance, the forward force 62 would cause the lower end 82 of the knee bolster 34 to move forward 32 and potentially upward 84. However, if something were to obstruct the forward 32 movement of the lower end 82 of the knee bolster 34, the knee bolster 34 would have a higher level of resistance to the forward force 62.

Figure 7:
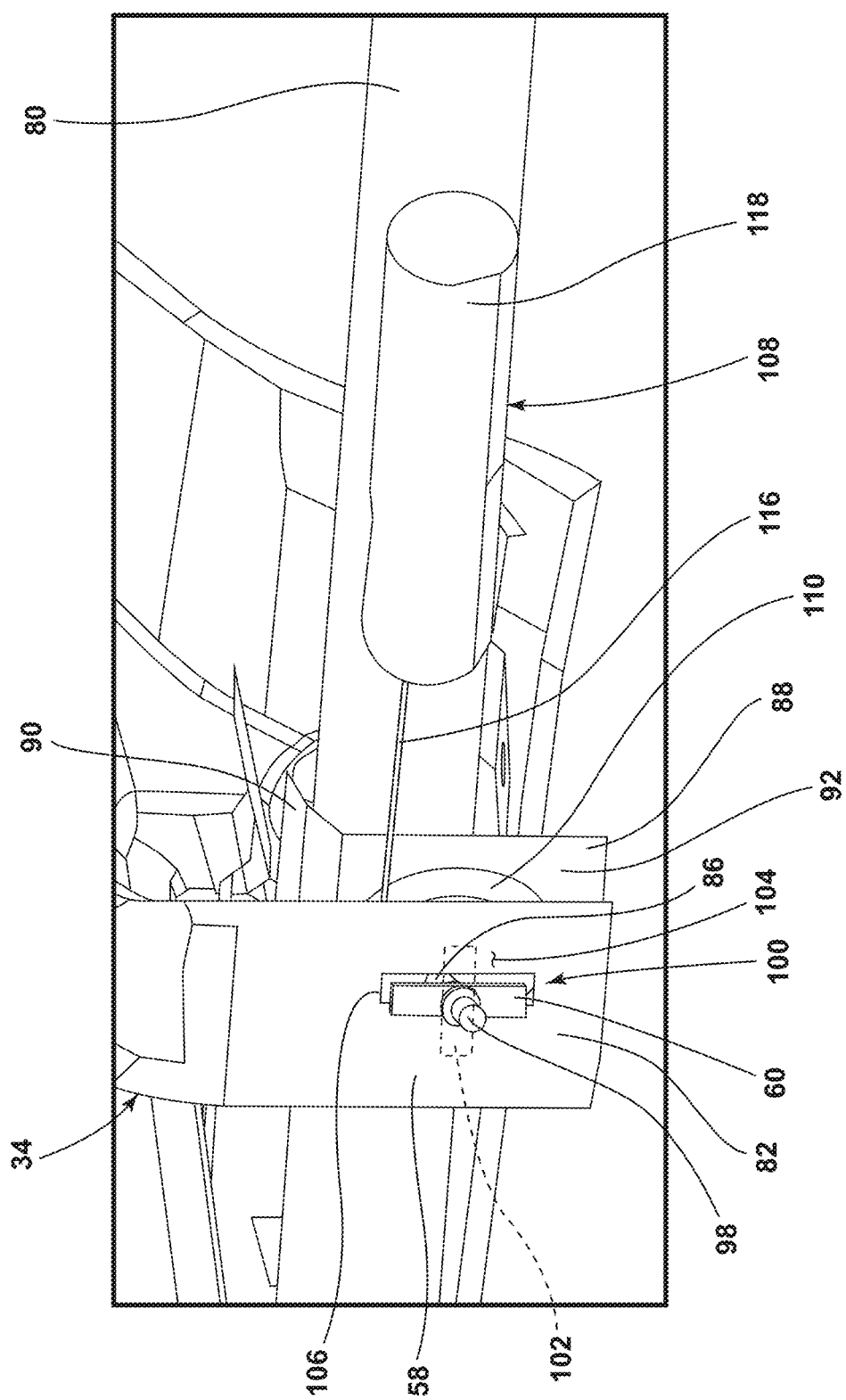
FIG. 7 is a perspective view of area VII of FIG. 4, illustrating an actuator attached to the second cross beam, the cable attached to the actuator, and the lower end of the knee bolster having an aperture that allows the lower end of the knee bolster to move over and around the movable obstruction when the movable obstruction is in the non-obstructing position.
Figure 8:
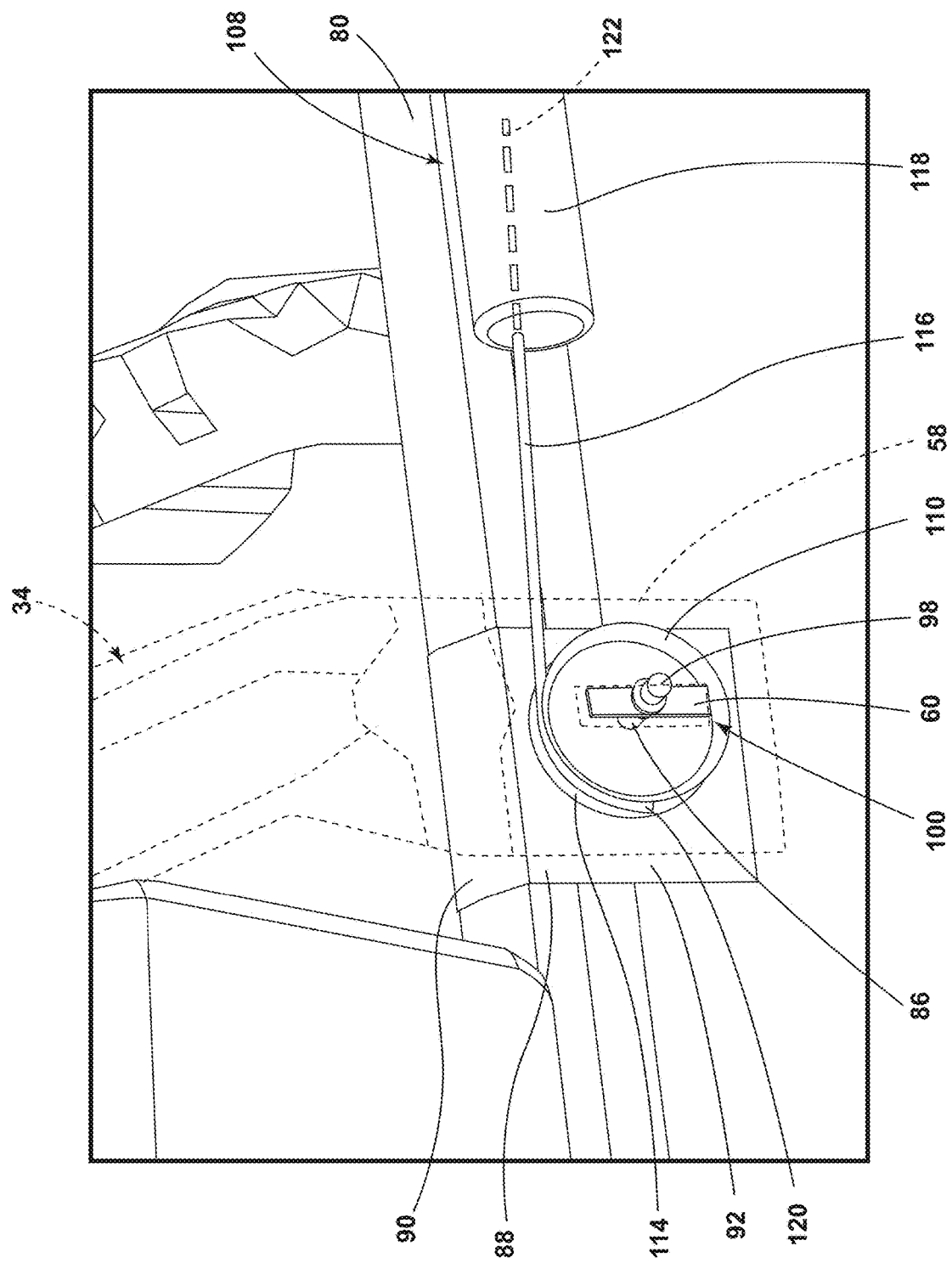
FIG. 8 is a perspective view looking rearward at the lower end of the knee bolster in phantom, illustrating the cable attached to both the actuator and the pulley, so that the pulley rotates as the actuator pulls the cable.
Figure 9:
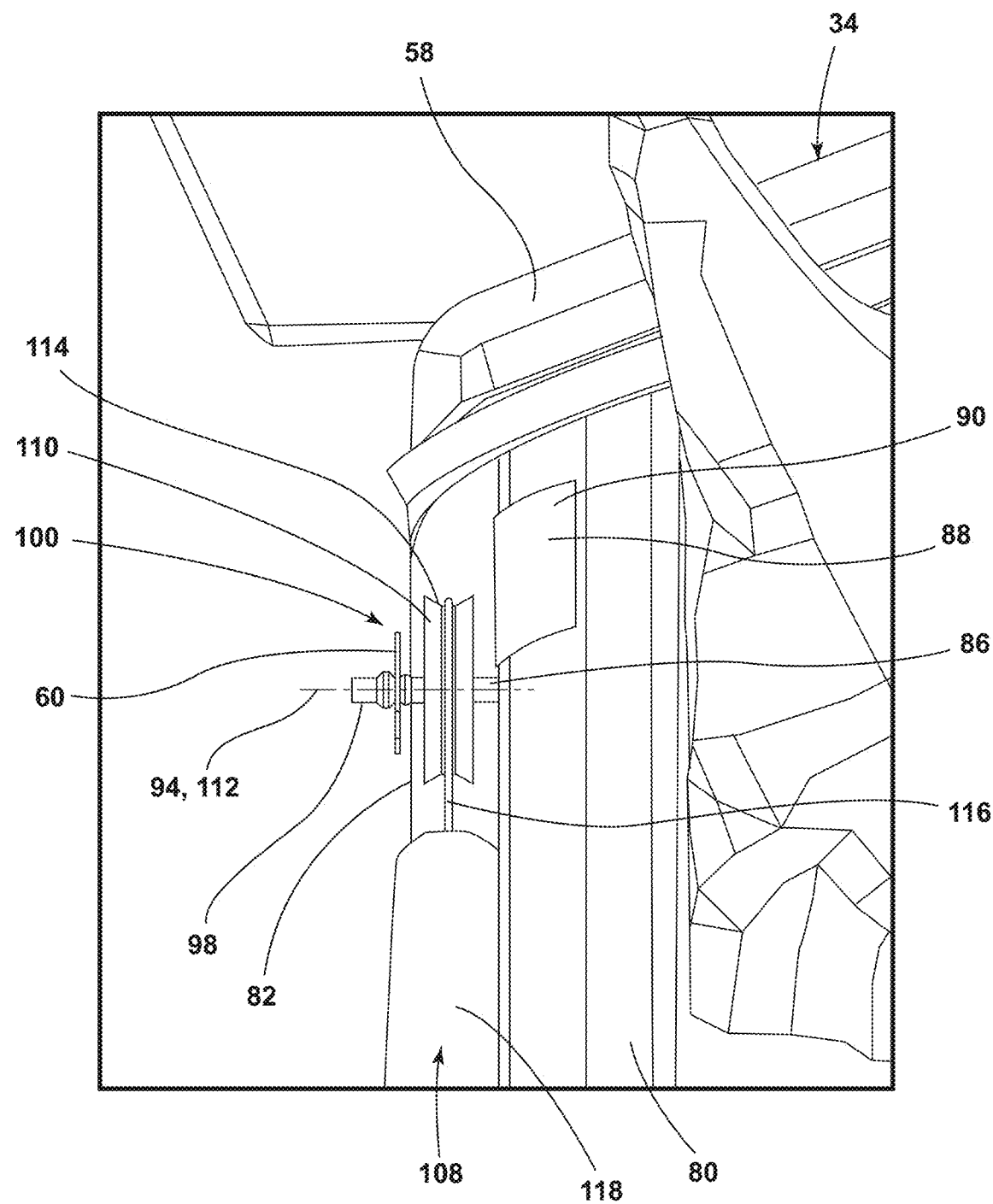
FIG. 9 is a perspective view looking downward at the lower end of the knee bolster from an inboard side, illustrating the axle and the pulley sharing an axis of rotation, and the lower end of the knee bolster being disposed forward of the pulley and the second cross beam.

Referring now additionally to FIGS. 7-9, the vehicle 10 further includes the movable obstruction 60. The movable obstruction 60 is disposed longitudinally forward 32 of the knee bolster 34. As will be explained, when the movable obstruction 60 is moved to a position to not obstruct forward 32 movement of the second section 58 of the knee bolster 34 (the lower end 82, in the illustrated embodiment), the knee bolster 34 imparts the relatively lower level of resistance to the forward 32 movement of the knee bolster 34. However, when the movable obstruction 60 is moved to a position to obstruct the forward 32 movement of the second section 58 of the knee bolster 34, the knee bolster 34 imparts a relatively higher level of resistance to the forward 32 movement of the knee bolster 34. The relatively higher level of resistance may be favorable to the passenger 16 of relatively heavier weight (e.g., the 50th percentile male). The relatively lower level of resistance may be favorable to the passenger 16 of relatively lighter weight (e.g., the 5th percentile female).

In embodiments, the vehicle 10 includes an axle 86 that is coupled to the second cross beam 80 (i.e., the lower cross beam 80). The movable obstruction 60 is attached to the axle 86. In the illustrated embodiment, a bracket 88 couples the axle 86 to the second cross beam 80. The bracket 88 includes a first portion 90 that is attached to the second cross beam 80 and a second portion 92 that holds the axle 86. The first portion 90 can be attached to the second cross beam 80 such as with fasteners or welding. The first portion 90 of the bracket 88 is disposed rearward 36 of the second section 58 (i.e., the lower end 82) of the knee bracket 88. The second portion 92 is disposed forward 32 of the second cross beam 80 and rearward 36 of the lower end 82 of the knee bracket 88. The axle 86 is rotatable about an axis 94. The axle 86 has a rear end 96, which the second portion 92 of the bracket 88 holds and allows the rear end 96 of the axle 86 to rotate about the axis 94. In addition, the axle 86 has a forward end 98, which is forward 32 of the rear end 96. In this manner, the axle 86 projects forward 32 from the second cross beam 80. The movable obstruction 60 is attached to the axle 86 forward 32 of the lower end 82 of the knee bolster 34. Rotation of the axle 86 about the axis 94 thus causes rotation of the movable obstruction 60.

Figure 10:
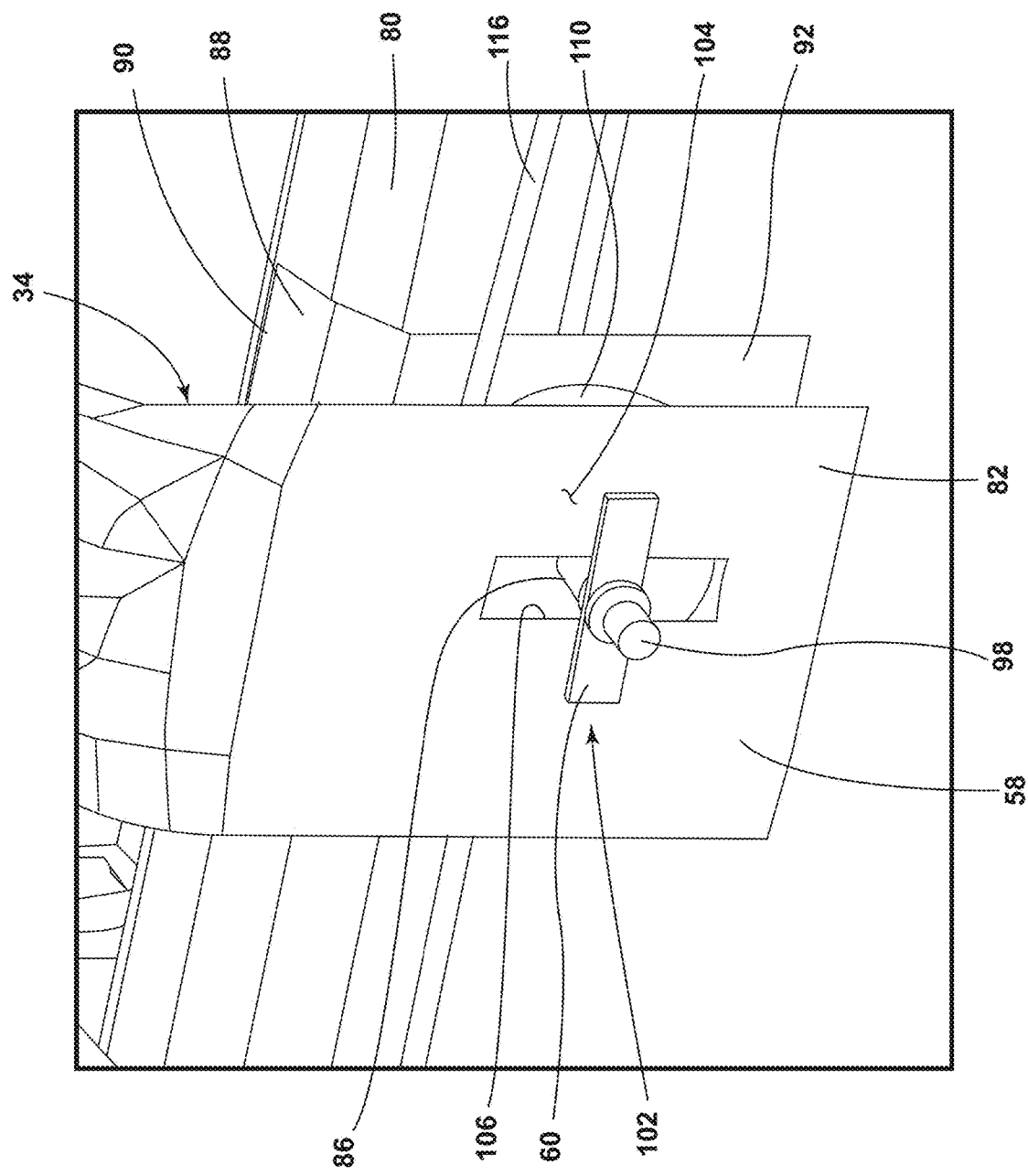
FIG. 10 is a perspective view looking rearward at the lower end of the knee bolster, illustrating the movable obstruction in an obstructing position that opposes a forward surface of the lower end of the knee bolster and thus opposes forward movement of the lower end of the knee bolster.
Figure 11:
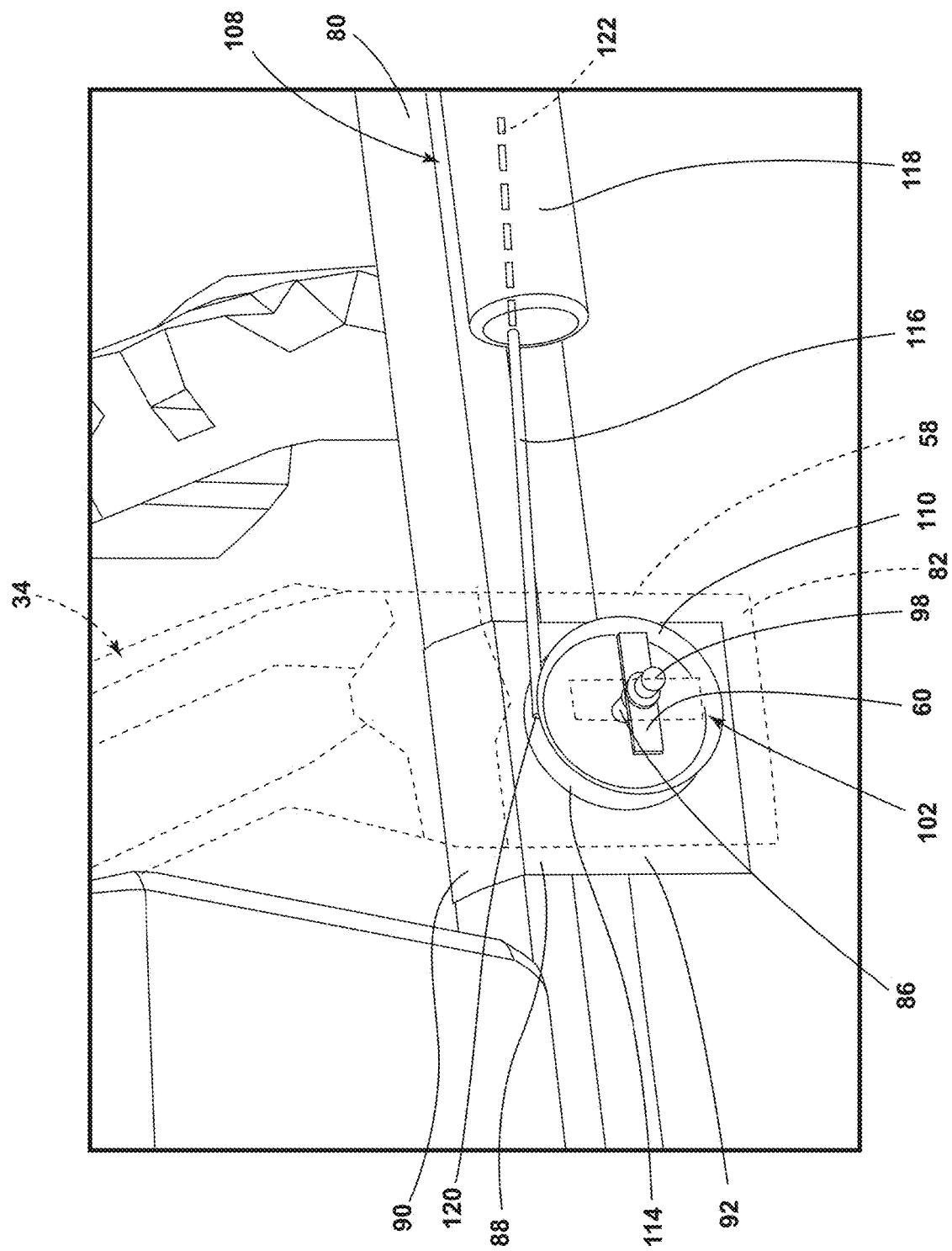
FIG. 11 is a perspective view looking rearward at the lower end of the knee bolster in phantom, illustrating the actuator having pulled the cable and thus having rotated the axle, the pulley, and the movable obstruction to the obstructing position to oppose forward movement of the lower end of the knee bolster.

The movable obstruction 60 has a non-obstructing position 100 and an obstructing position 102. FIGS. 6-9 illustrate the movable obstruction 60 in the non-obstructing position 100. FIGS. 10 and 11 illustrate the movable obstruction 60 in the obstructing position 102. The movable obstruction 60 can move to, from, and between the obstructing position 102 and the non-obstructing position 100. In the obstructing position 102 (FIGS. 10 and 11), the movable obstruction 60 resists forward 32 movement of lower end 82 of the knee bolster 34. In the obstructing position 102, the movable obstruction 60 is forward 32 of the lower end 82 of the knee bolster 34. In the obstructing position 102, the movable obstruction 60 is forward 32 of and opposes a forward surface 104 of the lower end 82 of the knee bolster 34. Thus, if the forward force 62 forces the lower end 82 of the knee bolster 34 forward 32, the forward surface 104 of the lower end 82 of the knee bolster 34 contacts the movable obstruction 60. The movable obstruction 60 resists further forward 32 movement of the knee bolster 34 due to the forward force 62 applied to the knee bolster 34.

In the non-obstructing position 100 (see FIGS. 6-9), the movable obstruction 60 is still longitudinally forward 32 of the lower end 82 of the knee bolster 34. However, the movable obstruction 60 does not oppose the forward surface 104 of the lower end 82 of the knee bolster 34. Thus, if a forward force 62 forces the lower end 82 of the knee bolster 34 forward 32, the forward surface 104 of the lower end 82 of the knee bolster 34 does not contact the movable obstruction 60. The movable obstruction 60 does not resist further forward 32 movement of lower end 82 of the knee bolster 34 due to the forward force 62 applied to the knee bolster 34. In the illustrated embodiment, the lower end 82 of the knee bolster 34 further includes an aperture 106 sized and shaped to avoid the movable obstruction 60 when the movable obstruction 60 is in the non-obstructing position 100. The axle 86 extends through the aperture 106 at the lower end 82 of the knee bolster 34. When the forward force 62 upon the knee bolster 34 pushes the lower end 82 of the knee bolster 34 forward 32, the aperture 106 at the lower end 82 passes over and around the movable obstruction 60.

The vehicle 10 further includes an actuating assembly 108. The actuating assembly 108 effectuates the movement of the movable obstruction 60 from the obstructing position 102 to the non-obstructing position 100, or from the non-obstructing position 100 to the obstructing position 102. In embodiments, the actuating assembly 108 includes a pulley 110. The pulley 110 is attached to the axle 86 and has an axis 112 of rotation coincident with the axis 94 of the axle 86. The pulley 110 is disposed between the lower cross beam 80 and the lower end 82 of the knee bolster 34. Rotation of the pulley 110 thus causes the axle 86 to rotate. Thus, rotation of the pulley 110 causes the movable obstruction 60 to move. The movable obstruction 60 is attached to the axle 86 forward 32 of the pulley 110. The circumference of the pulley 110 includes a cradle 114. In embodiments, the actuating assembly 108 further includes a cable 116 and an actuator 118. The cable 116 has a first end 120 that is attached to the pulley 110 such as within the cradle 114. The cable 116 has a second end 122 that is attached to the actuator 118. In embodiments, such as the illustrated embodiment, the actuator 118 is a pyrotechnic device. Thus, the second end 122 of the cable 116 is attached to the pyrotechnic device. The pyrotechnic device has an internal firing mechanism (not illustrated) that fires upon command and pulls the second end 122 of the cable 116. The actuator 118 is attached to the lower cross beam 80, such as through the use of brackets or fasteners, or both. In the illustrated embodiment, the actuator 118 is a pyrotechnic device, and the pyrotechnic device is attached to the second cross beam 80 (i.e., the lower cross beam 80) through the use of fasteners (not illustrated). In other embodiments, the actuator 118 is a pneumatic cylinder with a rod attached to the second end 122 of the cable 116. In other embodiments, the actuator 118 is an electric motor.

Figure 12:
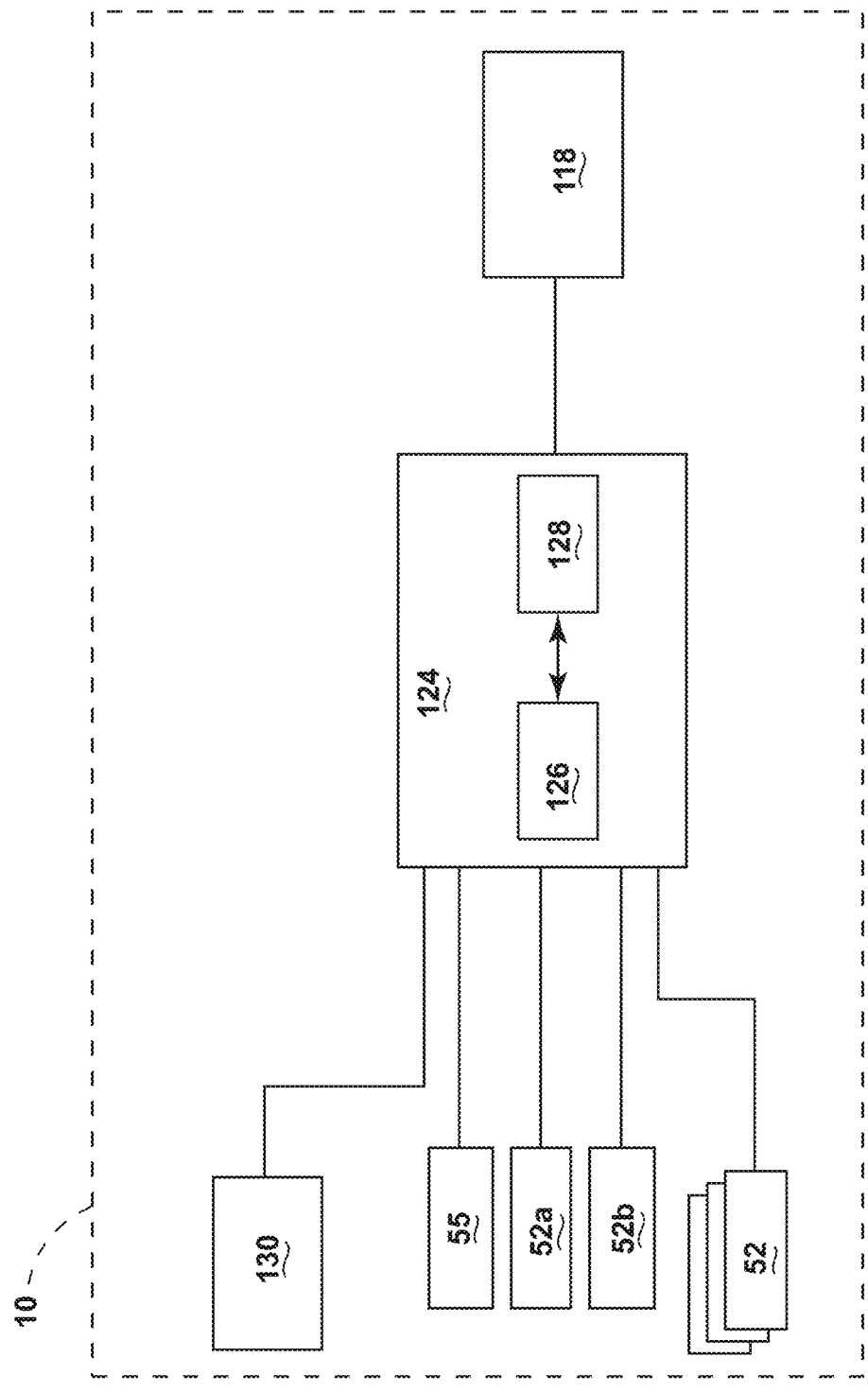
FIG. 12 is a schematic illustration of a controller of the vehicle of FIG. 1, receiving, as input, output from a user interface, an impact sensor, a weight sensor, a camera, and any other sensor from which the controller can determine an attribute of the passenger (such as the weight of the passenger) in order to control the actuator to move the movable obstruction to either (i) the obstructing position to grant the knee bolster greater resistance, or (ii) the non-obstructing position to grant the knee bolster lesser resistance, as a function of the determined attribute.

Referring back to FIG. 1 and additionally to FIG. 12, the vehicle 10 further includes a controller 124. The controller 124 is in communication with the user interface 55 or sensor 52 (or both) from which the attribute of the passenger 16 can be determined. In the illustrated embodiment, the controller 124 is in communication with one or more of the user interface 55, the sensor 52a in the seating assembly 14, the visual light sensor 52b (i.e., camera), and any other sensor 52 that generates an output to the controller 124 from which the desired attribute of the passenger 16 can be determined. The controller 124 is additionally in communication with the actuator 118. The controller 124 controls the action of the actuator 118, and thus the actuating assembly 108 and whether the movable obstruction 60 takes the non-obstructing position 100 or the obstructing position 102. The controller 124 can be a microprocessor-based controller 124 such as a computer having a central processing unit 126, memory 128 (RAM and/or ROM), and associated inputs and outputs operating in cooperation with a communications bus. The controller 124 can be a portion of a main control unit, such as a restraints control module or a main vehicle controller 124, or be a stand-alone controller 124. The memory 128 can store one or more programs to be executed in order to achieve what is described herein.

The controller 124 accepts the output of one or more of the user interface 55 and the various sensors 52 and determines the attribute of the passenger 16 from the output. The controller 124 then either (i) causes the movable obstruction 60 to take the obstructing position 102 to obstruct forward 32 movement of the knee bolster 34 based on the determined attribute of the passenger 16, or (ii) causes the movable obstruction 60 to take the non-obstructing position 100 and not to obstruct the forward 32 movement of the knee bolster 34 based on the determined attribute of the passenger 16. In embodiments, the controller 124 first determines, based on the received output of one or more of the user interface 55 and the sensor(s) 52, that the weight of the passenger 16 is greater than a predetermined threshold weight. The controller 124 then secondly controls the actuator 118 to move the movable obstruction 60 to the obstructing position 102 (or stay in the obstructing position 102 if already there) and thereby to obstruct forward 32 movement of the knee bolster 34. In embodiments, the movable obstruction 60 is in the non-obstructing position 100, and the controller 124 secondly controls the actuator 118 to move the movable obstruction 60 from the non-obstructing position 100 to the obstructing position 102. In embodiments, the controller 124 causes the movable obstruction 60 to obstruct forward 32 movement of the second section 58 of the knee bolster 34 by causing the movable obstruction 60 to move from (i) the non-obstructing position 100 that does not obstruct forward 32 movement of the second section 58 of the knee bolster 34 to (ii) the obstructing position 102 that opposes a forward surface 104 of the second section 58 of the knee bolster 34 and thereby obstructs forward 32 movement of the second section 58 of the knee bolster 34. In embodiments, the controller 124 causes the movable obstruction 60 to obstruct forward 32 movement of the second section 58 of the knee bolster 34 by causing the axle 86 to rotate and thereby rotate the movable obstruction 60 from the non-obstructing position 100 to the obstructing position 102. As discussed, in the illustrated embodiment, the second section 58 of the knee bolster 34 is the lower end 82 of the knee bolster 34. In embodiments where the actuator 118 is the pyrotechnic device, the controller 124 causes the axle 86 to rotate by causing the pyrotechnic device to fire. The pyrotechnic device firing pulls the cable 116, which rotates the pulley 110, which rotates the movable obstruction 60 from the non-obstructing position 100 to the obstructing position 102.

In embodiments, the controller 124 first determines, based on the received output of one or more of the user interface 55 and the sensor(s) 52, that the weight of the passenger 16 is less than a predetermined threshold weight. The controller 124 then secondly controls the actuator 118 to move the movable obstruction 60 to the non-obstructing position 100 (or stay in the non-obstructing position 100 if already there) and thereby not to obstruct forward 32 movement of the knee bolster 34. In embodiments, the movable obstruction 60 is in the obstructing position 102, and the controller 124 secondly controls the actuator 118 to move the movable obstruction 60 from the obstructing position 102 to the non-obstructing position 100. In embodiments, the controller 124 causes the movable obstruction 60 not to obstruct forward 32 movement of the second section 58 of the knee bolster 34 by causing the movable obstruction 60 to move from (i) the obstructing position 102 that obstructs forward 32 movement of the second section 58 of the knee bolster 34 to (ii) the non-obstructing position 100 that does not oppose a forward surface 104 of the second section 58 of the knee bolster 34 and thereby does not obstruct forward 32 movement of the second section 58 of the knee bolster 34. In embodiments, the controller 124 causes the movable obstruction 60 not to obstruct forward 32 movement of the second section 58 of the knee bolster 34 by causing the axle 86 to rotate and thereby rotate the movable obstruction 60 from the obstructing position 102 to the non-obstructing position 100. In embodiments where the actuator 118 is the pyrotechnic device, the controller 124 causes the axle 86 to rotate by causing the pyrotechnic device to fire. The pyrotechnic device firing pulls the cable 116, which rotates the pulley 110, which rotates the movable obstruction 60 from the obstructing position 102 to the non-obstructing position 100.

Figure 13:
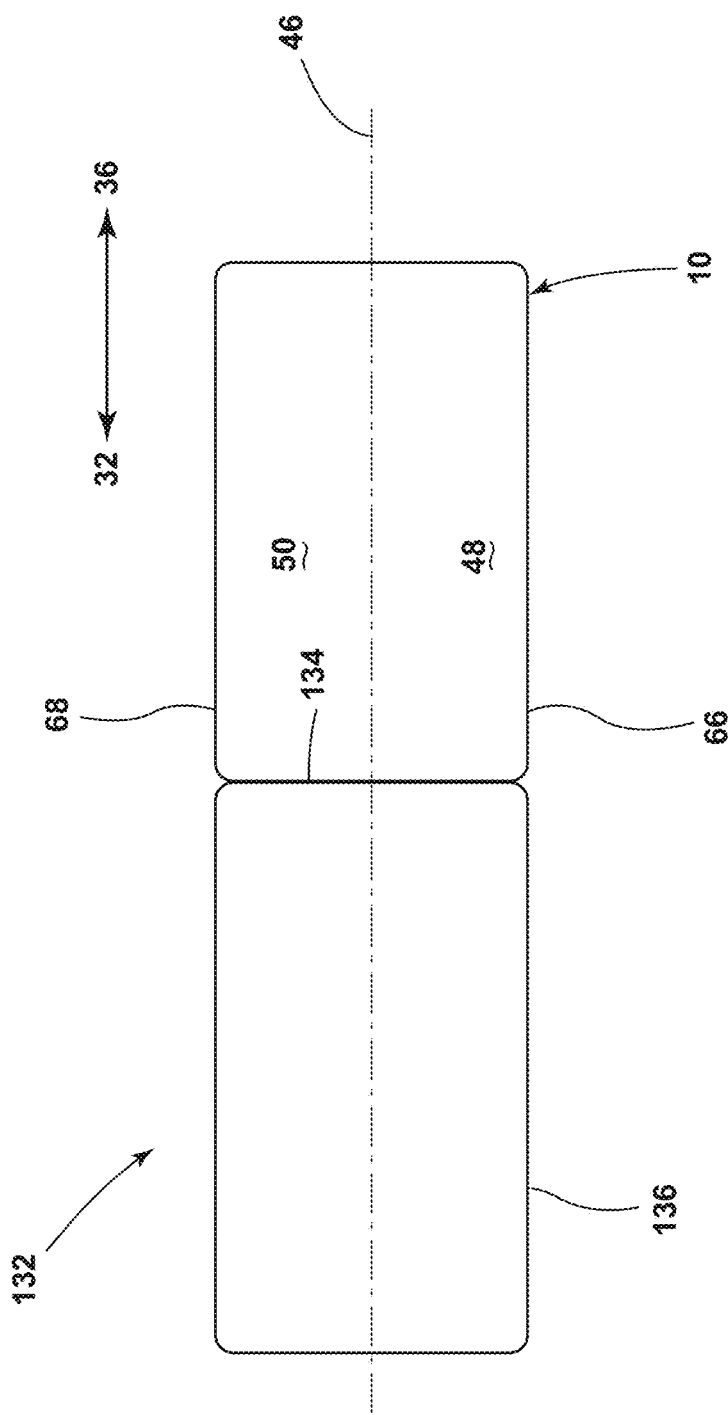
FIG. 13 is an overhead view of an impact event with a front of the vehicle of FIG. 1 impacting another object.

Referring back to FIGS. 1 and 12 and additionally to FIG. 13, in embodiments, the vehicle 10 further includes an impact sensor 130 that is in communication with the controller 124. The impact sensor 130 produces an output signal from which the controller 124 can determine that the vehicle 10 is engaged or about to be engaged in an impact event 132. The impact event 132 is when the vehicle 10, such as a front 134 of the vehicle 10, impacts another object 136. The impact event 132 is such that the passenger 16 exerts the forward force 62 upon the knee bolster 34, such as when the impact event 132 is at the front 134 of the vehicle 10. The impact sensor 130 can be one or more of an accelerometer, a pressure sensor, light detection and ranging (LIDAR), and a camera. The accelerometer generates an output signal from which the controller 124 can determine a deceleration indicative of the impact event 132 (e.g., a deceleration greater than a predetermined deceleration). The pressure sensor generates an output signal from which the controller 124 can determine a change in pressure indicative of the impact event 132 (e.g., a change in pressure greater than a predetermined change in pressure). LIDAR and a camera produce an output signal from which the controller 124 can determine that the vehicle 10 is about to encounter another object 136 and engage in the impact event 132. The impact sensor 130 can be disposed at or near the front 134 of the vehicle 10.

In embodiments, the controller 124, after determining the attribute of the passenger 16, does not cause the movable obstruction 60 to move from the non-obstructing position 100 to the obstructing position 102 (or from the obstructing position 102 to the non-obstructing position 100) until the controller 124 determines that the vehicle 10 is engaged in the impact event 132. That is, after determining the attribute of the passenger 16, the controller 124 determines that the vehicle 10 is engaged in an impact event 132 based on output data from the impact sensor 130 and then either (i) causes the movable obstruction 60 to obstruct forward 32 movement of the knee bolster 34 based on the determined attribute of the passenger 16, or (ii) causes the movable obstruction 60 not to obstruct the forward 32 movement of the knee bolster 34 based on the determined attribute of the passenger 16.

In embodiments, (i) the attribute of the passenger 16 is the weight of the passenger 16, (ii) the controller 124 determines that the weight of the passenger 16 is above a predetermined threshold weight, (iii) the controller 124 further determines that the vehicle 10 is engaged in the impact event 132 based on output from the impact sensor 130, and then (iv) the controller 124 causes the movable obstruction 60 to obstruct forward 32 movement of the knee bolster 34 (i.e., move the movable obstruction 60 from the non-obstructing position 100 to the obstructing position 102). In embodiments, the controller 124 is in communication with at least the weight sensor 52*a*, the impact sensor 130, and the pyrotechnic device. In those embodiments, the controller 124 (*i*) determines from output from the weight sensor 52*a* that the passenger 16 of the seating assembly 14 is greater than a predetermined threshold weight, (ii) determines that the vehicle 10 is engaged in the impact event 132 from output from the impact sensor 130, and (iii) causes the pyrotechnic device to fire thereby moving the movable obstruction 60 to the obstructing position 102 forward 32 of the lower end 82 of the knee bolster 34 so as to resist forward 32 movement of the lower end 82 of the knee bolster 34 during the impact event 132.

In embodiments, (i) the attribute of the passenger 16 is the weight of the passenger 16, (ii) the controller 124 determines that the weight of the passenger 16 is below a predetermined threshold weight, (iii) the controller 124 further determines that the vehicle 10 is engaged in the impact event 132 based on output from the impact sensor 130, and then (iv) the controller 124 causes the movable obstruction 60 not to obstruct forward 32 movement of the knee bolster 34 (i.e., move from the obstructing position 102 to the non-obstructing position 100). In embodiments, the controller 124 (*i*) determines from output from the weight sensor 52*a* that the passenger 16 of the seating assembly 14 is less than a predetermined threshold weight, (ii) determines that the vehicle 10 is engaged in the impact event 132 from output from the impact sensor 130, and (iii) causes the pyrotechnic device to fire thereby moving the movable obstruction 60 to the non-obstructing position 100 so as to not resist forward 32 movement of the lower end 82 of the knee bolster 34 during the impact event 132.

Figure 14:
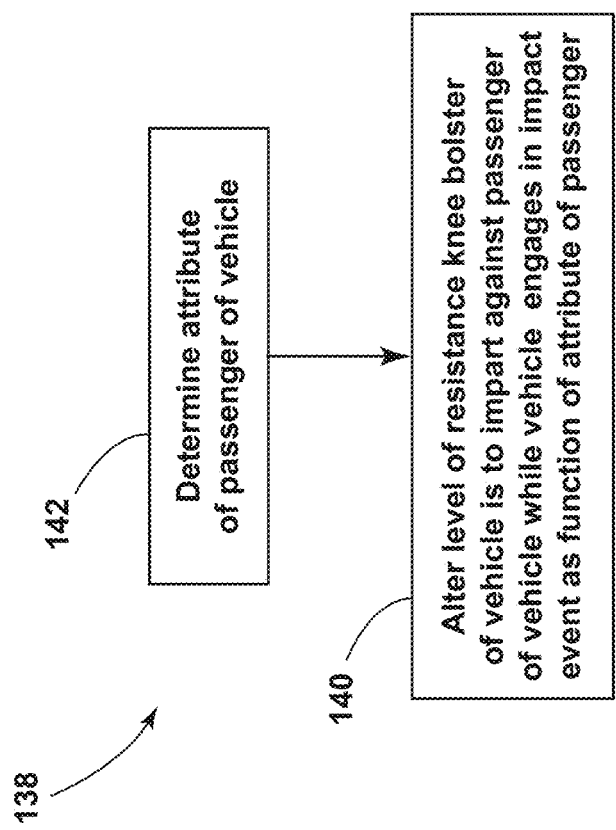
FIG. 14 is a flow chart of a method of the disclosure.

Referring now additionally to FIG. 14, a method 138 comprises, at a step 140, altering a level of resistance of the knee bolster 34 of the vehicle 10 against the passenger 16 of the vehicle 10 while the vehicle 10 engages in the impact event 132 as a function of the attribute of the passenger 16. The step 140 of altering the level of resistance of the knee bolster 34 includes either (i) moving the movable obstruction 60 from the non-obstructing position 100 to the obstructing position 102 opposing the forward surface 104 of the knee bolster 34, so as to resist forward 32 movement of the knee bolster 34, or (ii) moving the movable obstruction 60 from the obstructing position 102 to the non-obstructing position 100 not opposing the forward surface 104 of the knee bolster 34. In embodiments, the step 140 of altering the level of resistance of the knee bolster 34 includes either (i) moving the movable obstruction 60 to oppose the second section 58 of the knee bolster 34, or (ii) moving the movable obstruction 60 not to oppose the second section 58 of the knee bolster 34. In embodiments, the step 140 of altering the level of resistance of the knee bolster 34 includes either (i) firing the pyrotechnic device to pull the cable 116, rotate the pulley 110, and rotate the movable obstruction 60 to be forward 32 of the forward surface 104 of the lower end 82 of the knee bolster 34 to resist forward 32 movement of the lower end 82 of the knee bolster 34, or (ii) firing the pyrotechnic device to pull the cable 116, rotate the pulley 110, and rotate the movable obstruction 60 to the non-obstructing position 100 that is not forward 32 of the forward surface 104 of the lower end 82 of the knee bolster 34 so as to not resist forward 32 movement of the lower end 82 of the knee bolster 34.

In embodiments, the method 138 further comprises, at a step 142 (occurring before the step 140), determining the attribute of the passenger 16. The step 142 can include determining the weight of the passenger 16, the sex of the passenger 16, etc., as described above. The step 142 can include determining whether the weight of the passenger 16 exceeds a predetermined threshold weight. The step 142 can include determining whether the weight of the passenger 16 is below a predetermined threshold weight.

In embodiments, altering the level of resistance includes either (i) increasing the level of resistance when the weight of the passenger 16 is above a threshold value, or (ii) decreasing the level of resistance when the weight of the passenger 16 is below a threshold value. In embodiments, the weight of the passenger 16 is determined to exceed the predetermined threshold weight at step 140, and altering the level of resistance of the knee bolster 34 at step 142 includes increasing the level of resistance of the knee bolster 34. In embodiments, the weight of the passenger 16 is determined to be below the predetermined threshold weight, and altering the level of resistance includes decreasing the level of resistance of the knee bolster 34.

EXAMPLES

Several scenarios were considered using computer assisted engineering programs to determine the levels of resistance of the knee bolster 34 against the forward force 62 imparted onto the knee bolster 34 by the passenger 16, and specifically as felt by the left femur 40 of the passenger 16.

Figure 15:
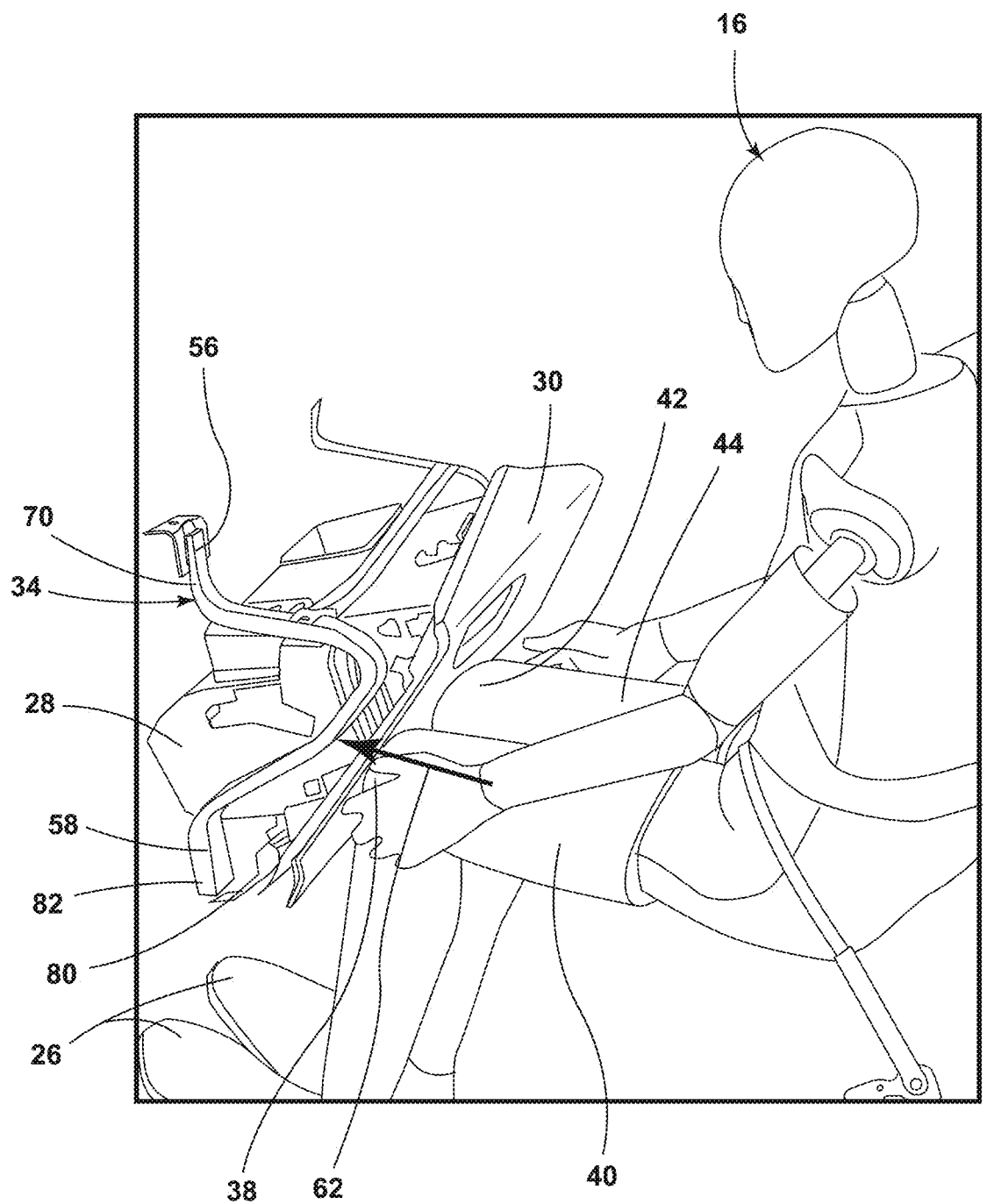
FIG. 15 is a perspective side view of the passenger of FIG. 1 during an impact event with the left knee of the passenger imposing a forward force upon the knee bolster through a door of a glove compartment while the lower end of the knee bracket was attached to the second cross beam (representing the movable obstruction being in the obstructing position granting the knee bolster relatively greater resistance to the forward force)
Figure 16:
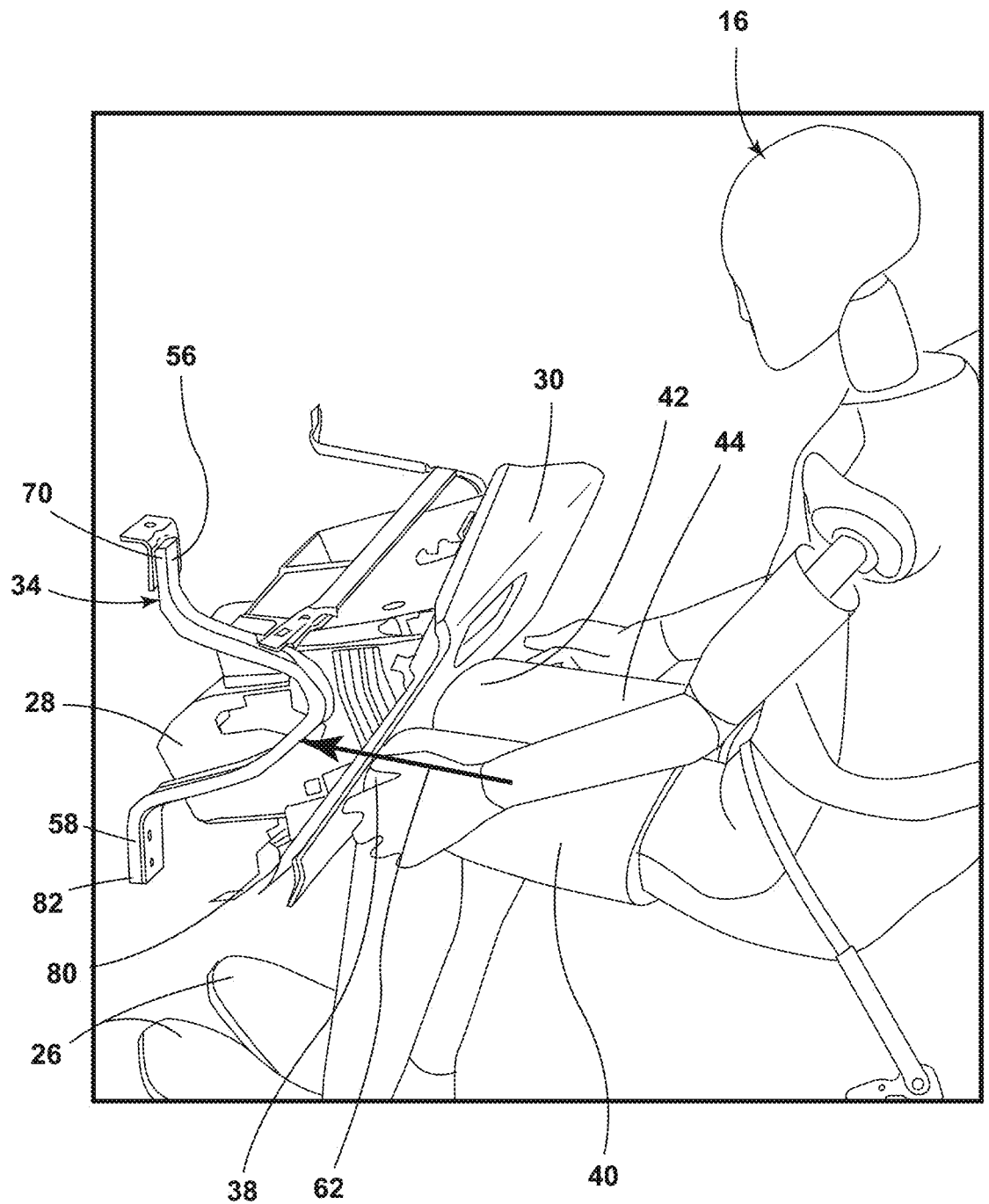
FIG. 16 is a perspective side view of the passenger (of FIG. 1 during the impact event with the left knee of the passenger imposing the forward force upon the knee bolster through the door of the glove compartment while the lower end of the knee bracket was not attached to the second cross beam (representing the movable obstruction being in the non-obstructing position granting the knee bolster relatively lesser resistance to the forward force).

Example 1. Referring now to FIGS. 15-16, the impact event 132 was simulated for the vehicle 10 moving forward 32 at a given speed, with the safety belt 57 securing the passenger 16 in the seating assembly 14, and the passenger 16 having certain sex, weight, and height attributes.

FIG. 15 illustrates the passenger 16 (simulated) imparting the forward force 62 upon the knee bolster 34 (because of the impact event 132, simulated) through the door 30 of the glove compartment 28 and the knee bolster 34 resisting the forward force 62 while attached to the lower cross beam 80 (simulating the movable obstruction 60 in the obstructing position 102 and providing the relatively higher resistance). In contrast, FIG. 16 illustrates the passenger 16 (simulated) imparting the forward force 62 upon the knee bolster 34 (because of the impact event 132, simulated) through the door 30 of the glove compartment 28 and the knee bolster 34 resisting the force while not attached to the lower cross beam 80 (simulating the movable obstruction 60 in the non-obstructing position 100 and providing the relatively lower resistance).

The load experienced upon the left femur 40 of the passenger 16 during the impact event 132 (simulated) was recorded for both the scenario illustrated in FIG. 15 and the scenario illustrated in FIG. 16. The load is proportional to the resistance of the knee bolster 34 to the forward force 62 imparted upon the knee bolster 34. When the lower end 82 of the knee bolster 34 was attached to the lower cross beam 80 (approximating the movable obstruction 60 being in the obstructing position 102) as illustrated in FIG. 15, the maximum load experienced by the left femur 40 was recorded. In contrast, when the lower end 82 of the knee bolster 34 was not attached to the lower cross beam 80 (i.e., the movable obstruction 60 being in the non-obstructing position 100) as illustrated in FIG. 16, the maximum load experienced by the left femur 40 was less compared to the maximum load recorded during the scenario of FIG. 15. While the maximum load recorded during the scenario of FIG. 15 might be optimal for the passenger 16 with one attribute (such as average weight), the lower maximum load recorded during the scenario of FIG. 16 might be optimal for the passenger 16 with another attribute (such as below average weight).

Example 2. In a second example, the impact event 132 was simulated for the vehicle 10 moving forward 32 at a given speed, with the safety belt 57 not securing the passenger 16 in the seating assembly 14, and the passenger 16 again having certain sex, weight, and height attributes.

The load experienced upon the left femur 40 of the passenger 16 during the impact event 132 (simulated) was recorded for both scenarios of (i) the lower end 82 of the knee bolster 34 being attached to the lower cross beam 80 (simulating the movable obstruction 60 in the obstructing position 102), and (ii) the lower end 82 of the knee bolster 34 not being attached to the lower cross beam 80 (simulating the movable obstruction 60 in the non-obstructing position 100). When the lower end 82 of the knee bolster 34 was not attached to the lower cross beam 80 (i.e., the movable obstruction 60 being in the non-obstructing position 100), the maximum load experienced by the left femur 40 was less than when the lower end 82 of the knee bolster 34 was attached to the lower cross beam 80 (approximating the movable obstruction 60 being in the obstructing position 102). While the higher maximum load might be optimal for the passenger 16 with one attribute (such as average weight), the lower maximum load might be optimal for the passenger 16 with another attribute (such as below average weight).

These examples demonstrate that the level of resistance of the knee bolster 34 to the forward force 62 that the passenger 16 imparts upon the knee bolster 34 during the impact event 132 can be made to vary as a function of whether the movable obstruction 60 is placed in the obstructing position 102 (essentially attaching the lower end 82 of the knee bolster 34 to the lower cross beam 80) or in the non-obstructing position 100 (leaving the lower end 82 of the knee bolster 34 unattached to the lower cross beam 80 and free to move forward 32). Further, the decision of whether to place the movable obstruction 60 in the obstructing position 102 to impart the higher level of resistance or in the non-obstructing position 100 to impart the lower level of resistance can vary as a function of the determined attribute (such as weight, sex, height) of the passenger 16, in order to provide the desired level of resistance.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method comprising:
  altering a level of resistance of a knee bolster of a vehicle against a passenger of the vehicle while the vehicle engages in an impact event as a function of an attribute of the passenger;
  wherein, altering the level of resistance of the knee bolster includes either (i) rotating a movable obstruction to an obstructing position opposing a forward surface of the knee bolster by rotating an axle attached to the movable obstruction, or (ii) rotating the movable obstruction from the obstructing position to a non-obstructing position not opposing the forward surface of the knee bolster by rotating the axle attached to the movable obstruction.

2. The method of claim 1, wherein
  the passenger has a weight, and the attribute of the passenger is the weight of the passenger; and
  altering the level of resistance includes either (i) increasing the level of resistance when the weight of the passenger is above a threshold value, or (ii) decreasing the level of resistance when the weight of the passenger is below a threshold value.

3. The method of claim 2 further comprising:
  determining the weight of the passenger.

4. The method of claim 2 further comprising:
  determining whether the weight of the passenger is above the threshold value.

5. The method of claim 4, wherein
the weight of the passenger is determined to be above the threshold value; and
altering the level of resistance of the knee bolster of the vehicle includes increasing the level of resistance of the knee bolster.

6. The method of claim 4, wherein
the weight of the passenger is determined to be below the threshold value; and
altering the level of resistance of the knee bolster of the vehicle includes decreasing the level of resistance of the knee bolster.

7. The method of claim 3, wherein
determining the weight of the passenger includes a weight sensor disposed within a seating assembly that the passenger occupies providing an output signal from which the weight of the passenger is determined.

8. The method of claim 1, wherein
rotating the movable obstruction comprises rotating a pulley operably connected to the movable obstruction, and rotating the pulley causes the movable obstruction to rotate.

9. The method of claim 1, wherein
the vehicle further comprises a support structure;
the knee bolster comprises a first section connected to the support structure and a second section not connected to the support structure; and
altering the level of resistance of the knee bolster comprises either (i) rotating the movable obstruction to oppose the second section of the knee bolster; or (ii) rotating the movable obstruction not to oppose the second section of the knee bolster.

10. The method of claim 1, wherein
the vehicle further comprises (i) an upper cross beam, (ii) a lower cross beam that is disposed horizontally below the upper cross beam, the axle projecting forward from the lower cross beam, (iii) a pyrotechnic device attached to the lower cross beam, (iv) a pulley attached to the axle and having an axis of rotation coincident with an axis of the axle, the movable obstruction attached to the axle forward of the pulley, and (v) a cable attached to the pulley and the pyrotechnic device;
the knee bolster further includes an upper end that is attached to the upper cross beam, and a lower end disposed horizontally below the upper end and adjacent to the lower cross beam and forward of the lower cross beam, the lower end of the knee bolster including an aperture through which the axle extends, with the pulley disposed between the lower cross beam and the lower end of the knee bolster and the movable obstruction forward of a forward surface of the lower end of the knee bolster; and
altering the level of resistance of the knee bolster includes either (i) firing the pyrotechnic device to pull the cable, rotate the pulley, and rotate the movable obstruction to be forward of the forward surface of the lower end of the knee bolster to resist forward movement of the lower end of the knee bolster, or (ii) firing the pyrotechnic device to pull the cable, rotate the pulley, and rotate the movable obstruction to not be forward of the forward surface of the lower end of the knee bolster to not resist forward movement of the lower end of the knee bolster.

11. A vehicle comprising:
a support structure;
a knee bolster comprising a first section coupled to the support structure and a second section that is not coupled to the support structure;
an axle rotatable about an axis;
a movable obstruction attached to the axle, the movable obstruction disposed forward of the knee bolster;
a seating assembly rearward of the knee bolster;
a sensor that generates output from which an attribute of a passenger of the seating assembly can be determined; and
a controller in communication with the sensor that (a) determines the attribute of the passenger from the output that the sensor generates, and (b) either (i) causes the movable obstruction to obstruct forward movement of the knee bolster based on the determined attribute of the passenger by causing the axle to rotate thereby causing the movable obstruction to move from a non-obstructing position that does not obstruct forward movement of the second section of the knee bolster to an obstructing position that obstructs forward movement of the second section of the knee bolster, or (ii) causes the movable obstruction not to obstruct the forward movement of the knee bolster based on the determined attribute of the passenger by causing the axle to rotate thereby causing the movable obstruction to move from the obstructing position that obstructs forward movement of the second section of the knee bolster to the non-obstructing position that does not obstruct forward movement of the second section of the knee bolster.

12. The vehicle of claim 11, wherein
the passenger has a weight, and the attribute of the passenger is the weight of the passenger; and
the controller causes the movable obstruction to obstruct forward movement of the second section of the knee bolster based on the weight of the passenger being greater than a predetermined threshold weight.

13. The vehicle of claim 11, wherein
the controller causes the movable obstruction to obstruct forward movement of the knee bolster by causing the axle to rotate and thereby causing the movable obstruction to move from the non-obstructing position that does not obstruct forward movement of the knee bolster to the obstructing position that obstructs forward movement of the knee bolster.

14. The vehicle of claim 11, wherein:
the controller causes the movable obstruction to obstruct forward movement of the second section by causing the axle to rotate and thereby causing the movable obstruction to move from (i) the non-obstructing position that does not obstruct forward movement of the second section of the knee bolster to (ii) the obstructing position that opposes a forward surface of the second section of the knee bolster and thereby obstructs forward movement of the second section of the knee bolster.

15. The vehicle of claim 11, wherein
the support structure is a cross beam that extends laterally across the vehicle, and the vehicle further comprises a second cross beam that also extends laterally across the vehicle;
the second section is proximate the second cross beam but not coupled thereto;
the axle is coupled to the second cross beam; and
the controller causes the movable obstruction to obstruct forward movement of the second section of the knee bolster by causing the axle to rotate and thereby rotate the movable obstruction from the non-obstructing position to the obstructing position.

16. The vehicle of claim 15 further comprising:

(i) a pyrotechnic device attached to the second cross beam and in communication with the controller, (ii) a pulley attached to the axle and having an axis of rotation coincident with the axis of the axle, and (iii) a cable attached to the pulley and the pyrotechnic device;

wherein, the controller causes the axle to rotate by causing the pyrotechnic device to fire, which pulls the cable, which rotates the pulley, which rotates the movable obstruction from the non-obstructing position to the obstructing position.

17. The vehicle of claim 11 further comprising:

an impact sensor in communication with the controller;

wherein, the controller determines that the vehicle is engaged in an impact event based on output data from the impact sensor and then either (i) causes the movable obstruction to obstruct forward movement of the second section of the knee bolster based on the determined attribute of the passenger, or (ii) causes the movable obstruction not to obstruct the forward movement of the second section of the knee bolster based on the determined attribute of the passenger.

18. The vehicle of claim 11, wherein the attribute of the passenger is a weight of the passenger;

the controller determines that the weight of the passenger is above a predetermined threshold weight; and the controller further determines that the vehicle is engaged in an impact event based on output from an impact sensor and then causes the movable obstruction to obstruct forward movement of the second section of the knee bolster.

19. A vehicle comprising:

an upper cross beam extending laterally across the vehicle;

a lower cross beam extending laterally across the vehicle, the lower cross beam being horizontally below the upper cross beam;

a pyrotechnic device attached to the lower cross beam;

an axle projecting forward from the lower cross beam;

a pulley attached to the axle and having an axis of rotation coincident with an axis of the axle;

a cable including a first end attached to the pyrotechnic device and a second end attached to the pulley;

a knee bolster including an upper end attached to the upper cross beam and a lower end proximate the lower cross beam but not attached thereto;

a movable obstruction attached to the axle forward of the pulley, the movable obstruction having an obstructing position forward of the lower end of the knee bolster so as to resist forward movement of the lower end of the knee bolster, and a non-obstructing position that does not resist forward movement of the lower end of the knee bolster;

a seating assembly including a weight sensor;

an impact sensor; and a controller in communication with the weight sensor, the impact sensor, and the pyrotechnic device.

20. The vehicle of claim 19, wherein the controller (i) determines from output from the weight sensor that a passenger of the seating assembly is greater than a predetermined threshold weight, (ii) determines that the vehicle is engaged in an impact event from output from the impact sensor, and (iii) causes the pyrotechnic device to fire thereby moving the movable obstruction to the obstructing position forward of the lower end of the knee bolster so as to resist forward movement of the lower end of the knee bolster during the impact event.

* * * * *